(12) United States Patent
Cui et al.

(10) Patent No.: US 9,985,293 B2
(45) Date of Patent: May 29, 2018

(54) STRUCTURE THAT ENCAPSULATES LITHIUM METAL FOR HIGH ENERGY DENSITY BATTERY ANODE

(71) Applicant: The Board of Trustees of the Leland Stanford Junior University, Palo Alto, CA (US)

(72) Inventors: Yi Cui, Stanford, CA (US); Kai Yan, Santa Clara, CA (US); Steven Chu, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 7 days.

(21) Appl. No.: 15/423,376

(22) Filed: Feb. 2, 2017

(65) Prior Publication Data
US 2017/0214054 A1    Jul. 27, 2017

Related U.S. Application Data

(63) Continuation-in-part of application No. 14/790,885, filed on Jul. 2, 2015.

(60) Provisional application No. 62/292,610, filed on Feb. 8, 2016, provisional application No. 62/022,813, filed on Jul. 10, 2014.

(51) Int. Cl.
*H01M 4/62*    (2006.01)
*H01M 2/16*    (2006.01)
*H01M 4/66*    (2006.01)
*H01M 4/38*    (2006.01)

(52) U.S. Cl.
CPC ......... *H01M 4/628* (2013.01); *H01M 2/1673* (2013.01); *H01M 4/382* (2013.01); *H01M 4/661* (2013.01)

(58) Field of Classification Search
None
See application file for complete search history.

(56) References Cited

U.S. PATENT DOCUMENTS

2010/0227225 A1*    9/2010    Segawa ............... H01M 10/052
429/324

OTHER PUBLICATIONS

Yan et al. "Selective deposition and stable encapsulation of lithium through heterogeneous seeded growth." Nature Energy vol. 1, Article No. 16010 (2016).*
Cui et al. "The recent advances in contructing designed electrode in lithium metal batteries." Chinese Chemical Letters 28 (2017) 2171-2179.*

* cited by examiner

*Primary Examiner* — Alix Eggerding
(74) *Attorney, Agent, or Firm* — Lumen Patent Firm

(57) ABSTRACT

A battery includes 1) an anode, 2) a cathode, and 3) an electrolyte disposed between the anode and the cathode. The anode includes a current collector and an interfacial layer disposed over the current collector, and the interfacial layer includes an array of interconnected, protruding regions that define spaces.

1 Claim, 22 Drawing Sheets

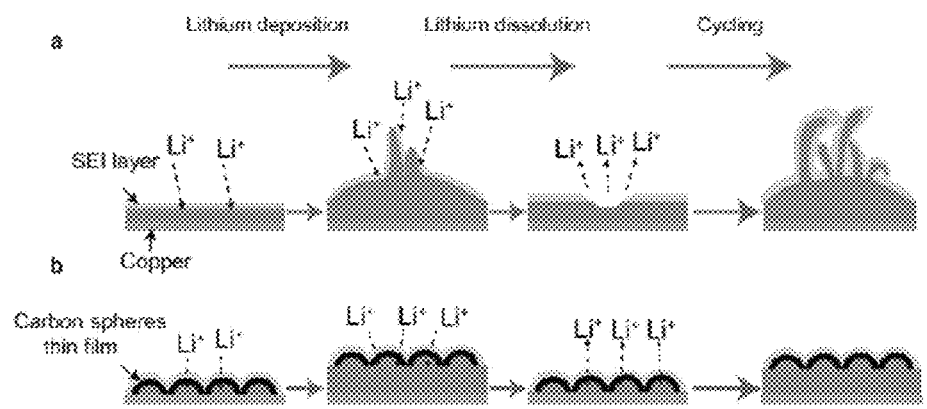
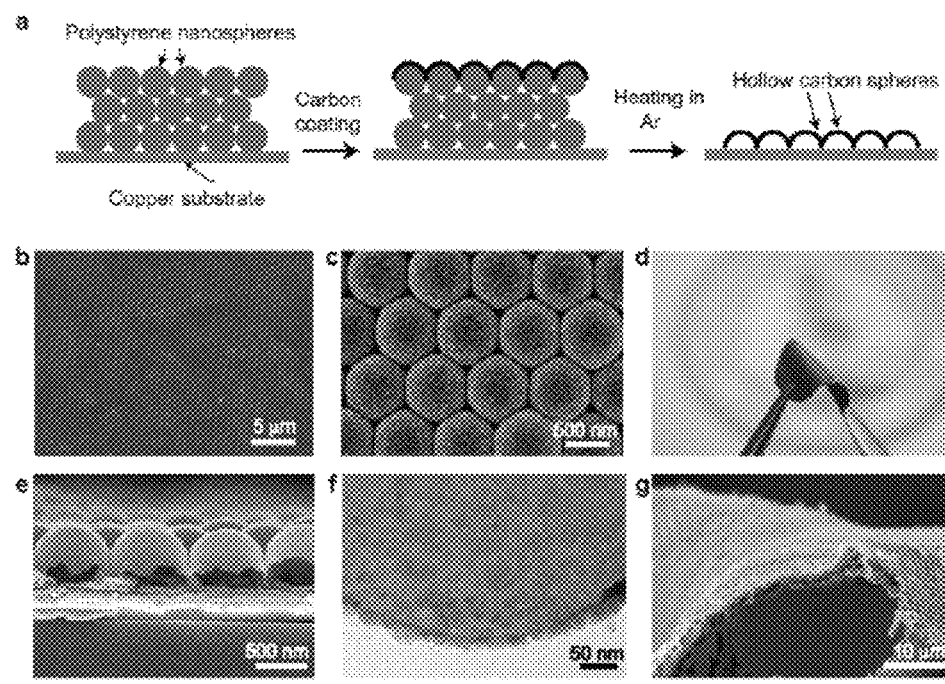

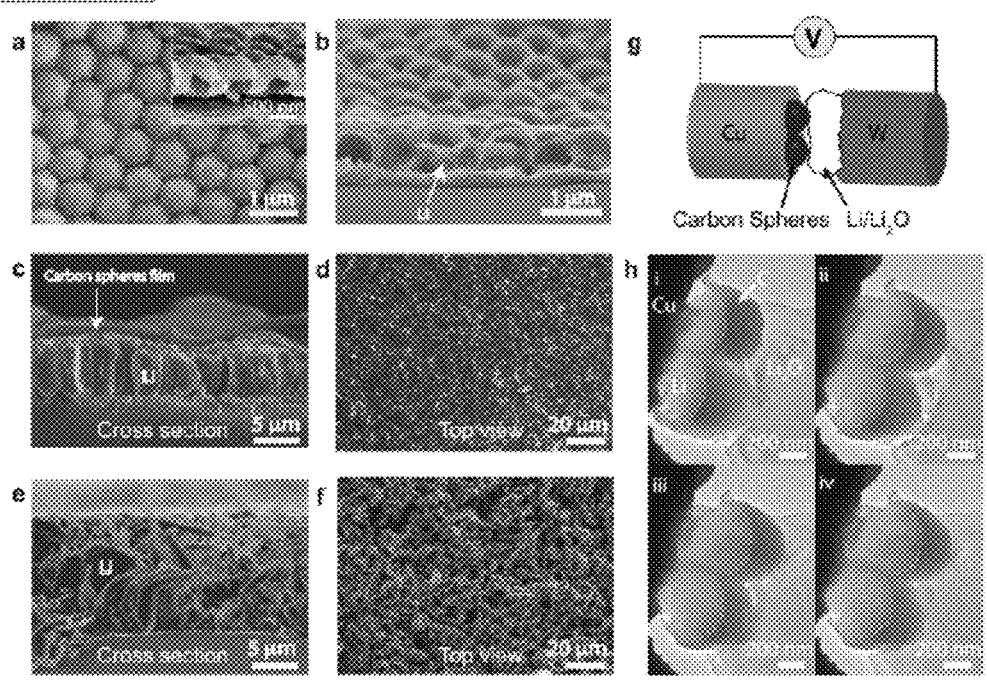

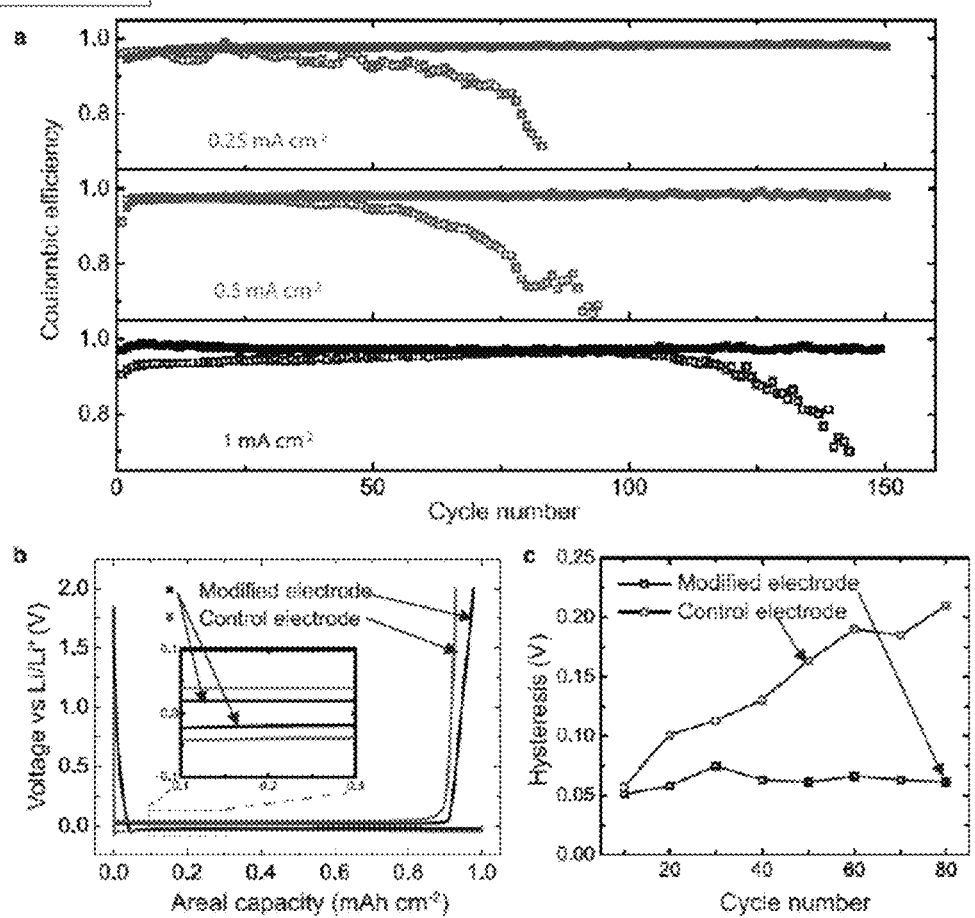

STRUCTURE THAT ENCAPSULATES LITHIUM METAL FOR HIGH ENERGY DENSITY BATTERY ANODE

CROSS-REFERENCE TO RELATED APPLICATIONS

This application claims priority from U.S. Provisional Patent Application 62/292,610 filed Feb. 8, 2016, which is incorporated herein by reference. This application is a continuation-in-part of U.S. patent application Ser. No. 14/790,885 filed Jul. 2, 2015, which is incorporated herein by reference.

STATEMENT OF GOVERNMENT SPONSORED SUPPORT

This invention was made with Government support under contract DE-EE0006828 awarded by the Department of Energy. The Government has certain rights in the invention.

FIELD OF THE INVENTION

This disclosure relates to interfacial layers for lithium (or Li) metal anodes and batteries incorporating lithium metal anodes protected by interfacial layers.

BACKGROUND OF THE INVENTION

For applications in portable electronics, electric vehicles, and grid storage, among others, batteries with higher energy storage density than current Li-ion batteries should be developed. Recent efforts in this direction have focused on high-capacity electrode materials. In particular, as an anode material, Li metal would be an optimal choice because it has the highest specific capacity (about 3860 mAh g$^{-1}$) and the lowest anode potential among contemplated candidates. However, Li metal anode tends to form dendritic and mossy metal deposits, causing serious safety concerns and low Coulombic efficiency during charge/discharge cycles. Though advanced characterization techniques have helped shed light on the Li growth process, effective strategies to improve Li metal anode cycling remain lacking.

It is against this background that a need arose to develop the embodiments described herein.

SUMMARY OF THE INVENTION

One aspect of this disclosure relates to a battery. In some embodiments, the battery includes 1) an anode, 2) a cathode, and 3) an electrolyte disposed between the anode and the cathode. The anode includes a current collector and an interfacial layer disposed over the current collector, and the interfacial layer includes an array of interconnected, protruding regions that define spaces.

In other embodiments, the battery includes 1) an anode, 2) a cathode, and 3) an electrolyte disposed between the anode and the cathode. The anode includes a current collector and an interfacial layer disposed over the current collector, and the interfacial layer includes an array of interconnected, encapsulating structures that define interior spaces.

Another aspect of this disclosure relates to a battery electrode. In some embodiments, the battery electrode includes 1) a current collector, 2) an interfacial layer disposed over the current collector, and 3) an electrode material disposed between the current collector and the interfacial layer. The interfacial layer includes a layered material.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 9: Schematic diagrams of different lithium anode structures. a, Thin film of solid electrolyte interphase (SEI) layer forms quickly on a surface of deposited lithium. Volumetric change of the lithium deposition process can readily break down the SEI layer, especially at a high current rate. This behavior leads to ramified growth of lithium dendrites and rapid consumption of the electrolytes. b, Modifying the copper substrate with hollow carbon nanosphere layer creates a scaffold for stabilizing the SEI layer. Volumetric change of the lithium deposition process is accommodated by the flexible hollow carbon nanosphere coating.

FIG. 10: Fabrication of hollow carbon nanosphere coated electrode. a, Fabrication process of the hollow carbon nanosphere modified copper electrode. (From left to right) Polystyrene nanoparticles are first deposited onto a copper substrate. A thin film of amorphous carbon is coated on top of the polystyrene array using flash evaporation of carbon. Thermal decomposition of the polystyrene template results in the formation of interconnected hollow carbon nanospheres. b, c, Scanning electron microscope (SEM) images of the carbon coated polystyrene nanoparticles array at low and high magnifications, respectively. The slight morphology change of the carbon nanospheres to hexagonal shape could be due to the elevated temperature during the carbon coating process. d, Digital camera image of the as-fabricated hollow carbon nanosphere thin film after removal of the polystyrene template. e, Cross-sectional SEM image of the hollow carbon nanospheres. f, Transmission electron microscope (TEM) image of the hollow carbon nanospheres, with wall thickness of about 20 nm. g, SEM image of the hollow carbon nanosphere thin film peeled off from the copper substrate. The red dashed line traces the curvature of bending.

FIG. 11: Lithium deposition on copper substrate with and without carbon nanosphere modification. a-f, SEM image of copper electrode after lithium deposition, with and without carbon nanosphere modification. a, Top-view SEM image of hollow carbon nanospheres after the initial SEI formation process. Inset shows the hollow carbon nanosphere structure is preserved after SEI coating. b, Cross-sectional SEM image showing the initial deposition of lithium metal underneath the carbon nanospheres. c, Deposited lithium elevates the hollow carbon nanosphere thin film due to the weak binding with the copper substrate. The carbon nanosphere coating allows more uniform lithium flux, and the deposited lithium is columnar rather than dendritic. d, Top-view SEM images show the smooth surface of the electrode with the carbon nanosphere modification. e, For the electrode without carbon nanosphere modification, ramified growth of mossy lithium/dendrites is observed. f, The corresponding top-view SEM image of the electrode without modification. g, Schematic showing the configuration of the in situ TEM cell. Hollow carbon nanospheres are grown on copper wire and serves as the working electrode. The counter electrode is a small piece of Li metal coated with $Li_2O$ (solid electrolyte) on the tip of a tungsten wire. A voltage bias of about −5 V is applied between the two electrodes to drive the lithium deposition. h, Time series of TEM images of the lithium deposition process on copper wires decorated with the hollow carbon nanospheres. Lithium metal approaches the carbon nanospheres from the right and deposition is observed once a voltage bias is applied. Each image is labeled with the number of seconds after the first image is recorded.

FIG. 12: Electrochemical characterization of the electrodes for lithium deposition/dissolution. a, Comparison of cycling performance of the hollow carbon nanosphere modified electrode and the control copper electrode at different current rates. The amount of lithium deposited in each cycle is about 1 mAh $cm^{-2}$. The solid symbols represent results of the carbon nanosphere modified electrode while the hollow symbols represent data of control copper electrode. b, Voltage profiles of the lithium deposition/dissolution process with lithium metal as the reference electrode at about 0.5 mA $cm^{-2}$. c, Comparison of the hysteresis of Li deposition/dissolution for the modified electrode and the control electrode with Li metal as reference/counter electrode.

DETAILED DESCRIPTION

Lithium Metal-Based Anodes

Embodiments of this disclosure relate to improved lithium metal-based anodes and the incorporation of such anodes in electrochemical energy storage devices, such as batteries. Embodiments of this disclosure can effectively address the challenges of lithium metal anodes that otherwise can lead to low Coulombic efficiency, short cycle life safety, and safety concerns resulting from lithium dendrite formation. Batteries incorporating such improved anodes can show high Coulombic efficiency that is retained over extended cycling, and can show little or no formation of lithium dendrites at practical current densities. Together with the high specific capacity of lithium metal, batteries incorporating such improved anodes are desirable for use in various applications, including portable electronics, electric vehicles, and grid storage, among others.

Some embodiments relate to an interfacial layer for a lithium metal anode that effectively addresses one or both of the following challenges: 1) controlling the reactivity of lithium metal towards an electrolyte; and 2) accommodating the large change in volume of the lithium metal anode during cycling, as lithium metal is "hostless," and its relative volumetric change is effectively unconstained. With respect to 1), the interfacial layer can serve as an effective barrier disposed between at least a portion of a surface of the lithium metal anode and the electrolyte to control and suppress reactivity between lithium metal and the electrolyte. In some embodiments, the interfacial layer can separate or isolate lithium metal deposition and dissolution on one side of the interfacial layer from formation of a stable solid electrolyte interphase (SEI) on the other side of the interfacial layer. In conjunction, the interfacial layer allows for the passage of lithium ions through walls of the interfacial layer, thereby affording ionic conductivity or permeability for lithium metal deposition and dissolution. With respect to 2), the interfacial layer of some embodiments can be loosely attached to the surface of the lithium metal anode, and can be displaced away and towards the anode surface during lithium metal deposition and dissolution, thereby accommodating the large volumetric change of the anode during cycling. Alternatively, or in conjunction, the interfacial layer of some embodiments can define spaces or voids to accommodate the volumetric change.

Figure 1:
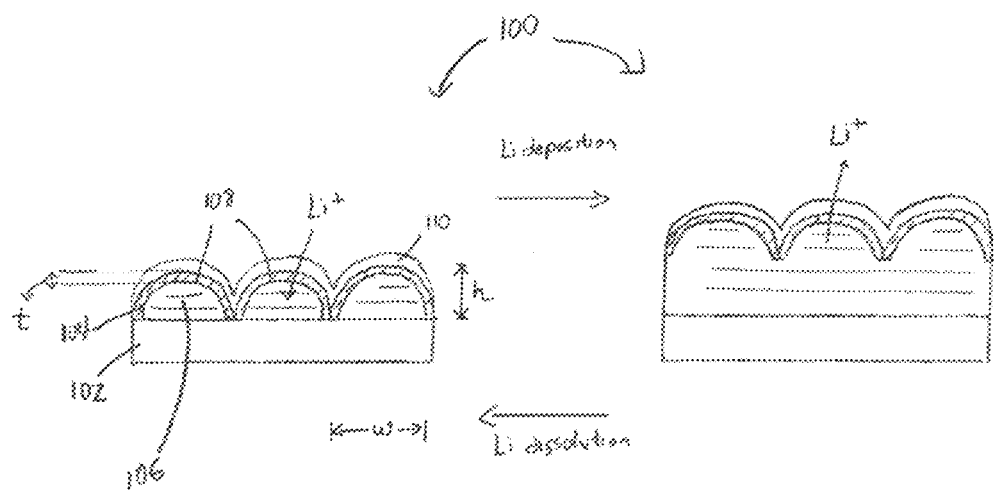
FIG. 1: Schematic of an embodiment of a lithium metal-based anode.

Referring to an embodiment of FIG. 1, a lithium metal-based anode 100 is provided, including a current collector 102 and an interfacial layer 104 disposed over and covering at least a portion of a top surface of the current collector 102. The current collector 102 can be formed of a metal (e.g., copper), a metal alloy, or other suitable electronically conductive material. As shown in FIG. 1, an anode material 106, which corresponds to lithium metal in this embodiment, is disposed between the current collector 102 and the interfacial layer 104.

In the embodiment of FIG. 1, the interfacial layer 104 is formed as a flexible array of interconnected, protruding regions 108 that are convex-shaped or dome-shaped. The arrangement of the protruding regions 108 within the array can be according to a square grid pattern, a rectangular grid pattern, a triangular grid pattern, a hexagonal grid pattern, or another ordered, disordered, or random pattern. The interfacial layer 104 separates or isolates lithium metal deposition and dissolution beneath the interfacial layer 104 from formation of a stable, conformal SEI 110 above the interfacial layer 104. Here, the interfacial layer 104 is formed of amorphous carbon, although other suitable materials are contemplated as further discussed below. Amorphous carbon, or another suitable material, is chemically inert or stable in contact with lithium metal, and is chemically inert or stable in a reducing environment of a battery incorporating the anode 100. Walls of the interfacial layer 104, which are formed of amorphous carbon or another suitable material, readily allow the passage of lithium ions to afford rapid ionic transport, while possessing high mechanical strength to suppress and sustain the pressure induced by any lithium dendrite formation, such as a Young's modulus greater than about 6 GPa, such as at least about 10 GPa, at least about 50

GPa, at least about 100 GPa, at least about 150 GPa, at least about 200 GPa, at least about 300 GPa, at least about 400 GPa, at least about 500 GPa, at least about 600 GPa, at least about 700 GPa, at least about 800 GPa, or at least about 900 GPa, and up to about 1 TPa, up to about 5 TPa, or more.

The protruding regions 108 define spaces or voids to accommodate lithium metal deposition beneath the interfacial layer 104 and within the spaces, and their convex or dome shapes afford increased surface area for passage of lithium ions, relative to a flat or planar configuration. In some implementations, the increase in surface area can be, for example, at least about 1.5 times, at least about 2 times, at least about 2.5 times, at least about 3 times, at least about 3.5 times, or at least about 4 times, relative to a flat or planar configuration. Also, the interfacial layer 104 is loosely or weakly bound to the current collector 102 and can move up and down to adjust the availability of spaces during cycling. A top surface of the interfacial layer 104 is relatively static and allows the formation of the stable, conformal SEI 110, while lithium metal deposition takes place underneath, on the current collector 102. High flexibility of the interfacial layer 104 allows the interfacial layer 104 to accommodate the volumetric expansion of lithium metal deposition with little or no mechanical damage. For example, the interfacial layer 104 of some implementations can be deformed or subjected to a bending radius down to about 5 cm with little or no tearing or other irreversible mechanical damage, such as down to about 4 cm, down to about 3 cm, down to about 2 cm, down to about 1 cm, down to about 1 mm, down to about 500 µm, down to about 100 µm, down to about 50 µm, or down to about 20 µm or less.

Still referring to FIG. 1, the protruding regions 108 can have: 1) a width (w) (e.g., an outer diameter, an outer lateral dimension along a major axis, an averaged outer lateral dimension along a major axis and a minor axis, or another characteristic outer lateral dimension) in the range of about 10 nm to about 100 µm, such as about 20 nm to about 50 µm, from about 30 nm to about 40 µm, about 40 nm to about 30 µm, about 50 nm to about 20 µm, about 100 nm to about 10 µm, about 100 nm to about 5 µm, about 200 nm to about 10 µm, about 200 nm to about 5 µm, about 300 nm to about 10 µm, about 300 nm to about 5 µm, about 400 nm to about 10 µm, about 400 nm to about 5 µm, about 500 nm to about 10 µm, or about 500 nm to about 5 µm; 2) a height (h) in the range of about 10 nm to about 100 µm, such as about 20 nm to about 50 µm, from about 30 nm to about 40 µm, about 40 nm to about 30 µm, about 50 nm to about 20 µm, about 100 nm to about 10 µm, about 100 nm to about 5 µm, about 200 nm to about 10 µm, about 200 nm to about 5 µm, about 300 nm to about 10 µm, about 300 nm to about 5 µm, about 400 nm to about 10 µm, about 400 nm to about 5 µm, about 500 nm to about 10 µm, or about 500 nm to about 5 µm; and 3) an aspect ratio (e.g., specified as a ratio of the height and the width or h/w) that is about 3 or less, such as about 2 or less, about 1 or less, about 0.1 to about 3, about 0.5 to about 3, about 1 to about 3, about 2 to about 3, about 0.1 to about 2, about 0.5 to about 2, about 1 to about 2, about 0.1 to about 1, or about 0.5 to about 1. Higher aspect ratios, such as greater than about 3, are also contemplated as further discussed below. The walls of the protruding regions 108 can have a thickness (t) in the range of about 0.5 nm to about 100 nm, such as about 1 nm to about 90 nm, about 1 nm to about 80 nm, about 1 nm to about 70 nm, about 1 nm to about 60 nm, about 1 nm to about 50 nm, about 1 nm to about 40 nm, about 1 nm to about 30 nm, about 5 nm to about 30 nm, about 10 nm to about 30 nm, about 1 nm to about 20 nm, about 5 nm to about 20 nm, about 10 nm to about 20 nm, about 0.5 nm to about 20 nm, about 1 nm to about 10 nm, about 0.5 nm to about 10 nm, or about 5 nm to about 20 nm. The above specified values for dimensions, thicknesses, and aspect ratios can apply to an individual one of the protruding regions 108, or can represent an average or a median value across the protruding regions 108.

The interfacial layer 104 can be formed of other types of materials in place of, or in combination with carbon, such as layered materials (e.g., boron nitride, graphene, and layered metal oxides or chalcogenides like transition metal dichalcogenides), metal and non-metal carbides, metal and non-metal nitrides, metal and non-metal silicides, metals (e.g., copper, titanium, nickel, and other transition metals), and metal alloys. The interfacial layer 104 can be single-layered or multi-layered, with different layers formed of the same material or different materials. The material or materials forming the interfacial layer 104 can be chemically stable or inert with respect to lithium metal and components of an electrolyte, with the chemical stability manifested by, for example, either, or both, the substantial absence of lithium metal deposition on the top surface of the interfacial layer 104 and the substantial absence of cracks in the interfacial layer 104 after 50 charge/discharge cycles or more, after 100 charge/discharge cycles or more, after 150 charge/discharge cycles or more, after 200 charge/discharge cycles or more, after 300 charge/discharge cycles or more, after 400 charge/discharge cycles or more, after 500 charge/discharge cycles or more, after 1,000 charge/discharge cycles or more, or after 5,000 charge/discharge cycles or more. Alternatively, or in conjunction, the chemical stability of the interfacial layer 104 can be manifested by, for example, the dimensions, the thicknesses, and the aspect ratios of the protruding regions 108 remaining within ±20%, within ±15%, within ±10%, within ±5%, within ±1%, or within ±0.5% of their initial values, after 50 charge/discharge cycles or more, after 100 charge/discharge cycles or more, after 150 charge/discharge cycles or more, after 200 charge/discharge cycles or more, after 300 charge/discharge cycles or more, after 400 charge/discharge cycles or more, after 500 charge/discharge cycles or more, after 1,000 charge/discharge cycles or more, or after 5,000 charge/discharge cycles or more. In some embodiments, the material or materials forming the interfacial layer 104 can be different from, or can be substantially devoid of, lithium compounds or lithium-containing materials. The interfacial layer 104 can be ionically conductive or permeable with respect to lithium ions, or otherwise permit passage of lithium ions through pores, gaps, or defects. For example, an ionic conductivity (e.g., for lithium ions) of the interfacial layer 104 can be at least about $1 \times 10^{-4}$ S cm$^{-1}$, at least about $5 \times 10^{-4}$ S cm$^{-1}$, at least about $1 \times 10^{-3}$ S cm$^{-1}$, or at least about $5 \times 10^{-3}$ S cm$^{-1}$.

In some embodiments, the anode 100 can be formed by a template synthesis method, involving deposition of particles of a sacrificial material, such as polymeric nanoparticles, over the current collector 102. After deposition, the particles can be coated with a thin film of amorphous carbon or another suitable material, such as using flash evaporation of a carbon source. Next, the coated particles on the current collector 102 can be subjected to heating, such as in a tube furnace to a temperature in the range of about 300° C. to about 500° C. under an inert atmosphere, dissolution, or other removal technique for the sacrificial material, thereby forming the hollow, protruding regions 108 on the current collector 102. It is also contemplated that the interfacial layer 104 can be initially formed on a temporary substrate, and can be subsequently transferred to the current collector 102. The resulting anode 100 with the interfacial layer 104 on the current collector 102 can be combined with a cathode with preloaded lithium ions, which are then deposited on the current collector 102 as the anode material 106. Further details on the template synthesis method are set forth in Example 1 below.

Figure 2:
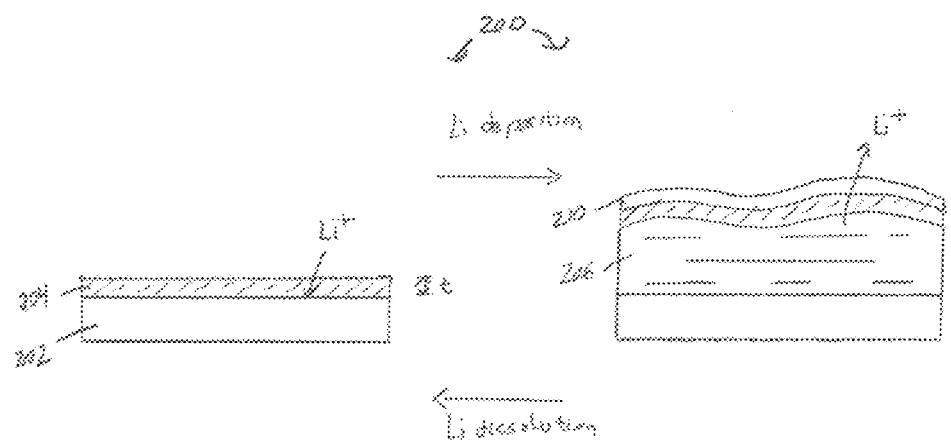
FIG. 2: Schematic of another embodiment of a lithium metal-based anode.

Other configurations of an interfacial layer are contemplated. Referring to another embodiment of FIG. 2, a lithium metal-based anode 200 is provided, including a current collector 202 and an interfacial layer 204 disposed over and covering at least a portion of a top surface of the current collector 202. The current collector 202 can be formed of a metal (e.g., copper), a metal alloy, or other suitable electronically conductive material. As shown in FIG. 2, an anode material 206, which corresponds to lithium metal in this embodiment, is disposed between the current collector 202 and the interfacial layer 204, and is deposited on the current collector 202 during cycling.

In the embodiment of FIG. 2, the interfacial layer 204 is formed as a flexible film having a largely flat or planar configuration. The interfacial layer 204 separates or isolates lithium metal deposition and dissolution beneath the interfacial layer 204 from formation of a stable, conformal SEI 210 above the interfacial layer 204. Here, the interfacial layer 204 is formed of a layered material, such as boron nitride or graphene, although other suitable materials listed above in connection with the embodiment of FIG. 1 are contemplated. Layered materials can include multiple sheets or layers, with covalent bonding between atoms of a particular sheet or layer, and weaker interactions, such as Van der Waals bonding, between sheets or layers, although a single-layered material also can be a suitable material, and at least some extent of covalent bonding can occur between sheets or layers of a multi-layered material. A combination of different materials are also contemplated, such as within different layers. Boron nitride, graphene, or another suitable layered material is chemically inert or stable in contact with lithium metal, and is chemically inert or stable in a reducing environment of a battery incorporating the anode 200. Walls of the interfacial layer 204, which are formed of a layered material, readily allow the passage of lithium ions through defects or gaps to afford rapid ionic transport, while possessing high mechanical strength to suppress and sustain the pressure induced by any lithium dendrite formation, such as having a Young's modulus in the ranges listed above in connection with the embodiment of FIG. 1.

The interfacial layer 204 is loosely or weakly bound to the current collector 202 and can move up and down to adjust the availability of spaces during cycling. A top surface of the interfacial layer 204 is relatively static and allows the formation of the stable, conformal SEI 210, while lithium metal deposition takes place underneath, on the current collector 202. High flexibility of the interfacial layer 204 allows the interfacial layer 204 to accommodate the volumetric expansion of lithium metal deposition with little or no mechanical damage. In general, the interfacial layer 204 can have a thickness (t) in the ranges listed above in connection with the embodiment of FIG. 1, and, in some implementations, the high flexibility of the interfacial layer 204 can be attained by a reduced thickness (t) corresponding to 1 to 50, 1 to 40, 1 to 30, 1 to 20, or 1 to 10 atomic layers of a layered material such as boron nitride or graphene. The interfacial layer 204 of some implementations can be deformed or subjected to a bending radius similar to those listed for the embodiment of FIG. 1, and the material or materials forming the interfacial layer 204 can be chemically stable or inert with respect to lithium metal and components of an electrolyte, with the chemical stability manifested similarly as explained for the embodiment of FIG. 1.

In some embodiments, the anode 200 can be formed by chemical vapor deposition (CVD) of a layered material over the current collector 202. Specifically, the current collector 202 can be heated, such as to a temperature in the range of about 800° C. about 1100° C. in an inert atmosphere at a low pressure, followed by introduction of a precursor of the layered material as a vapor. The partial pressure of the precursor can be kept within a particular range, such as about 10 mTorr to about 300 mTorr, and for a particular time period, such as up to about 20 min or up to about 10 min. After an initial stage of growth, discrete domains of the layered material can be formed, and these domains can gradually grow and coalesce into a substantially continuous film, with line defects along domain boundaries. In such manner, the interfacial layer 204 can be formed over the current collector 202. It is contemplated that the interfacial layer 204 can be formed using another deposition or coating technique in place of, or in conjunction with, CVD. It is also contemplated that the interfacial layer 204 can be initially formed on a temporary substrate, and can be subsequently transferred to the current collector 202. The resulting anode 200 with the interfacial layer 204 on the current collector 202 can be combined with a cathode with preloaded lithium ions, which are then deposited on the current collector 202 as the anode material 206. Further details on the CVD synthesis method are set forth in Example 2 below.

Figure 3:
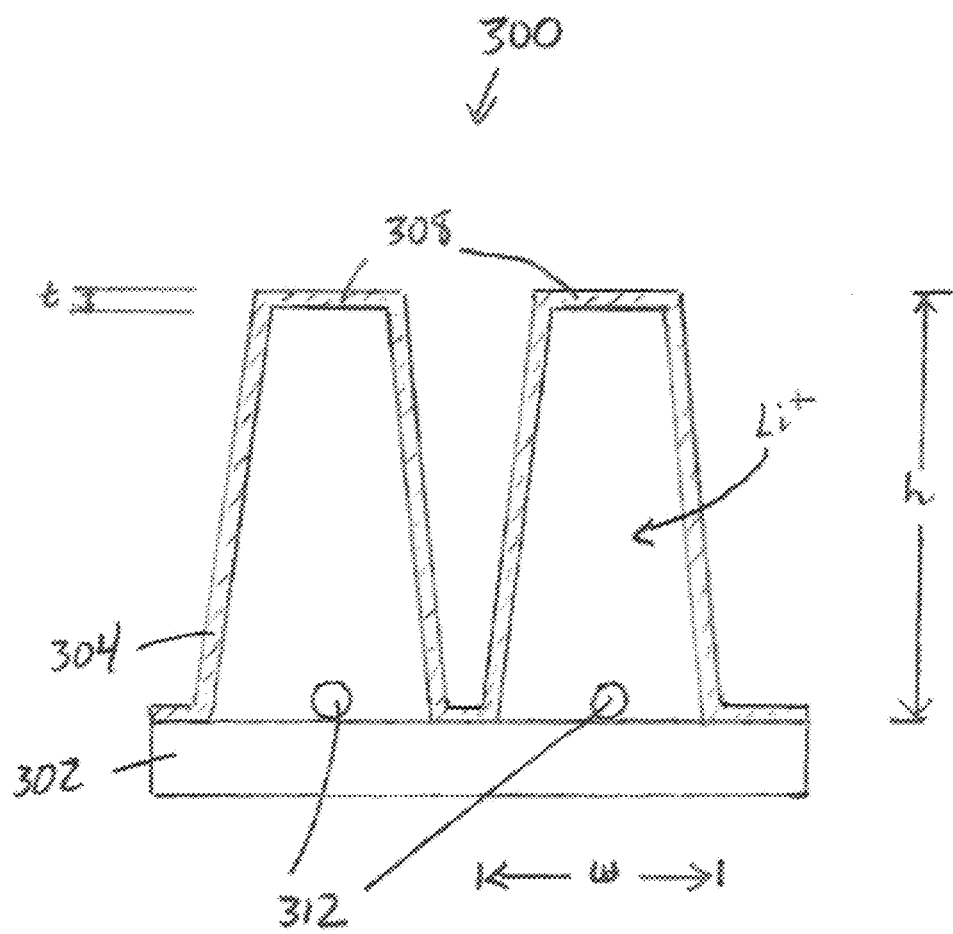
FIG. 3: Schematic of another embodiment of a lithium metal-based anode.

Referring to another embodiment of FIG. 3, a lithium metal-based anode 300 is provided, including a current collector 302 and an interfacial layer 304 disposed over and covering at least a portion of a top surface of the current collector 302. The current collector 302 can be formed of a metal (e.g., copper), a metal alloy, or other suitable electronically conductive material. Although not shown in FIG. 3, an anode material, which corresponds to lithium metal in this embodiment, can be disposed between the current collector 302 and the interfacial layer 304, and can be deposited on the current collector 302 during cycling.

In the embodiment of FIG. 3, the interfacial layer 304 is formed as a flexible array of interconnected, protruding regions 308 that are rod-shaped or otherwise are elongated or have high aspect ratios. The interfacial layer 304 separates or isolates lithium metal deposition and dissolution beneath the interfacial layer 304 from formation of a stable, conformal SEI above the interfacial layer 304. The interfacial layer 304 can be formed of a suitable material as listed above in connection with the embodiment of FIG. 1. A combination of different materials are also contemplated, such as within different layers. Walls of the interfacial layer 304 readily allow the passage of lithium ions to afford rapid ionic transport, while possessing high mechanical strength to suppress and sustain the pressure induced by any lithium dendrite formation, such as having a Young's modulus in the ranges listed above in connection with the embodiment of FIG. 1.

The protruding regions 308 define spaces or voids to accommodate lithium metal deposition beneath the interfacial layer 304 and within the spaces, and their elongated shapes and high aspect ratios afford increased surface area for passage of lithium ions, relative to a flat or planar configuration. In some implementations, the increase in surface area can be, for example, at least about 1.5 times, at least about 2 times, at least about 2.5 times, at least about 3 times, at least about 3.5 times, at least about 4 times, at least about 4.5 times, at least about 5 times, or at least about 10 times, relative to a flat or planar configuration. As shown in FIG. 3, seeds 312 are disposed between the interfacial layer 304 and the current collector 302 and within the spaces defined by the protruding regions 308, and the seeds 312 promote lithium metal deposition through, for example, a nucleation or an alloying mechanism. The seeds 312 can be formed of silicon, germanium, tin, gold, silver, zinc, magnesium or another suitable material. In some implementations, the interfacial layer 304 can be affixed to the current collector 302, with the spaces defined by the protruding regions 308 being sufficient to accommodate lithium deposition during cycling, and, in other implementations, the interfacial layer 304 can be loosely or weakly bound to the current collector 302 and can move up and down to adjust the availability of the spaces during cycling. A top surface of the interfacial layer 304 is relatively static and allows the formation of a stable, conformal SEI, while lithium metal deposition takes place underneath, on the current collector 302. Also, high flexibility of the interfacial layer 304 allows the interfacial layer 304 to accommodate the volumetric expansion of lithium metal deposition with little or no mechanical damage. The interfacial layer 304 of some implementations can be deformed or subjected to a bending radius similar to those listed for the embodiment of FIG. 1, and the material or materials forming the interfacial layer 304 can be chemically stable or inert with respect to lithium metal and components of an electrolyte, with the chemical stability manifested similarly as explained for the embodiment of FIG. 1.

In general, the interfacial layer 304 can have a thickness (t) of the walls and a width (w) and a height (h) of the protruding regions 308 in the ranges listed above in connection with the embodiment of FIG. 1. The width (w) of the protruding regions 308 can be substantially constant or can vary along the lengths of the protruding regions 308, and, in the case of the latter scenario, the width (w) of the protruding regions 308 can be specified as a lateral dimension at the base of the protruding regions 308 next to the current collector 302. In the embodiment of the FIG. 3, the protruding regions 308 can have an aspect ratio that is greater than about 3, such as about 3.5 or more, about 4 or more, about 4.5 or more, about 5 or more, about 10 or more, about 20 or more, about 30 or more, about 40 or more, and up to 50 or more, up to about 100 or more, or up to about 500 or more.

Figure 4A:
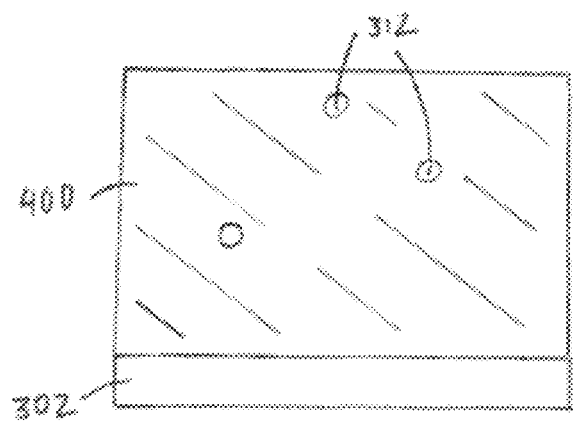
FIGS. 4(a), (b), and (c): Schematic of a sequence of operations of a template synthesis method of forming a lithium metal-based anode.
Figure 4B:
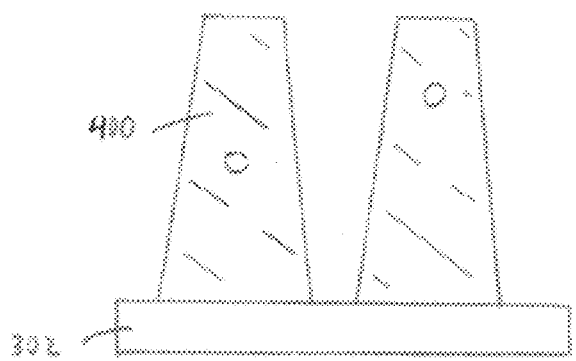
Figure 4C:
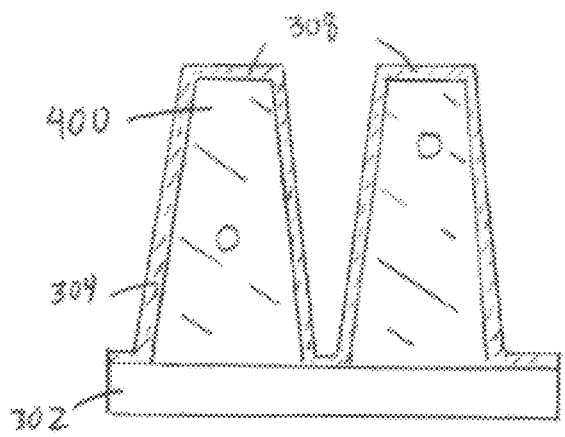

In some embodiments, the anode 300 can be formed by a template synthesis method, electro-spinning, or another suitable manufacturing method. In an embodiment of FIG. 4, the anode 300 can be formed by a template synthesis method, involving deposition or coating of a sacrificial material 400 over the current collector 302, and where the seeds 312 are dispersed in the sacrificial material 400 (FIG. 4(a)). After deposition or coating of the sacrificial material 400, the sacrificial material 400 is patterned, such as by photolithography (FIG. 4(b)), and a material or a combination of different materials can be deposited or coated over the patterned sacrificial material 400, thereby forming the interfacial layer 304 (FIG. 4(c)). Next, the coated sacrificial material 400 on the current collector 302 can be subjected to heating, dissolution, or other removal technique for the sacrificial material 400, thereby forming hollow, protruding regions 308 on the current collector 302 as shown in FIG. 3. It is also contemplated that the interfacial layer 304 can be initially formed on a temporary substrate, and can be subsequently transferred to the current collector 302. The resulting anode 300 with the interfacial layer 304 on the current collector 302 can be combined with a cathode with pre-loaded lithium ions, which are then deposited on the current collector 302 as an anode material.

Figure 5A:
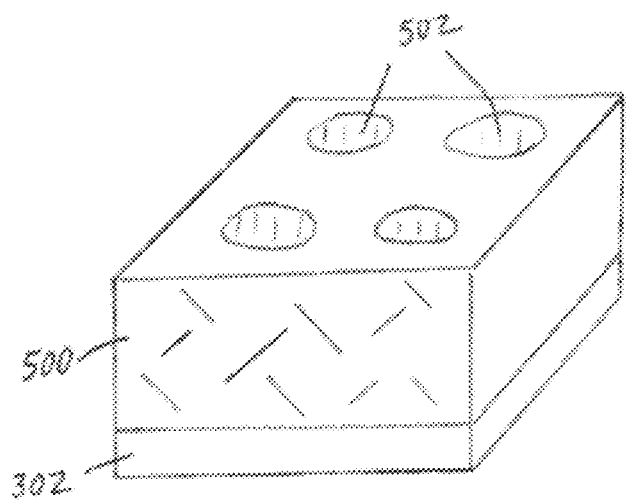
FIGS. 5(a) and (b): Schematic of a sequence of operations of another template synthesis method of forming a lithium metal-based anode.
Figure 5B:
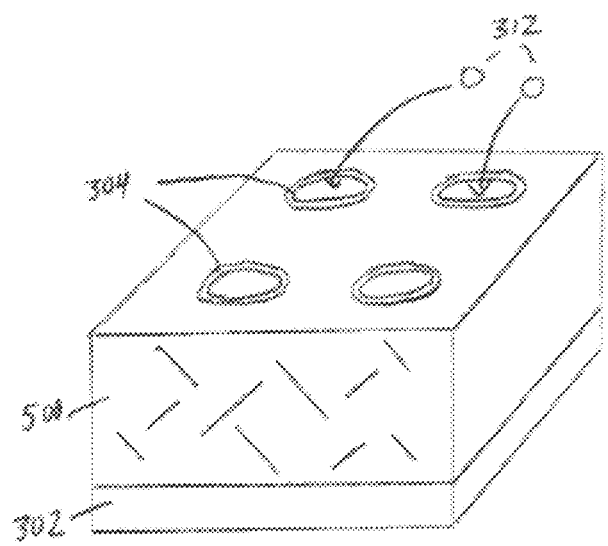

In another embodiment of FIG. 5, the anode 300 can be formed by a template synthesis method, involving the use of a porous template structure 500 that is disposed or formed over the current collector 302 (FIG. 5(a)). The template structure 500 can be, for example, an anodic aluminum oxide film or membrane. Next, a material or a combination of different materials forming the interfacial layer 304 can be deposited or coated over the template structure 500 to partially fill pores 502 (FIG. 5(b)), followed by disposing the seeds 312 into remaining spaces of the pores 502, such as by applying a suitable liquid or other carrier medium in which the seeds 312 are dispersed (FIG. 5(b)). Open ends of the interfacial layer 304 can be capped to reduce contact with an electrolyte, such as by depositing or otherwise applying a suitable material over the open ends. The template structure 500 can be subjected to etching or other removal technique, thereby forming the anode 300 as shown in FIG. 3.

Figure 6:
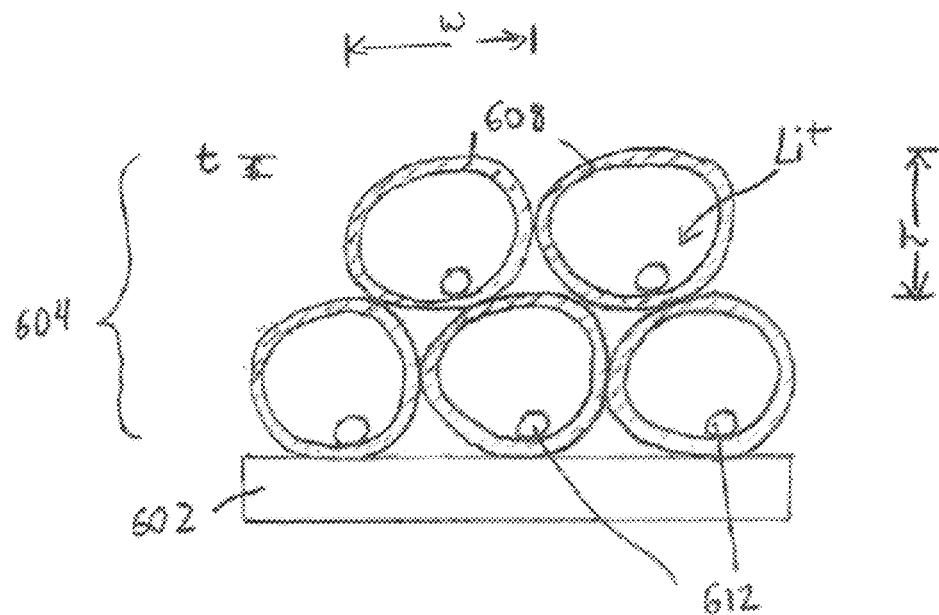
FIG. 6: Schematic of another embodiment of a lithium metal-based anode.

Referring to another embodiment of FIG. 6, a lithium metal-based anode 600 is provided, including a current collector 602 and an interfacial layer 604 disposed over and covering at least a portion of a top surface of the current collector 602. The current collector 602 can be formed of a metal (e.g., copper), a metal alloy, or other suitable electronically conductive material. Although not shown in FIG. 6, an anode material, which corresponds to lithium metal in this embodiment, can be disposed within spaces or voids defined by the interfacial layer 604, and can be deposited within the spaces during cycling.

In the embodiment of FIG. 6, the interfacial layer 604 is formed as an array of interconnected, hollow, encapsulating structures 608 that have a spherical or spheroidal shape, although a variety of other shapes are contemplated. The encapsulating structures 608 are in the form of shells defining interior spaces within the shells, and the encapsulating structures 608 separate or isolate lithium metal deposition and dissolution within the encapsulating structures 608 from formation of a stable, conformal SEI on the outside of the encapsulating structures 608. The interfacial layer 604 can be formed of a suitable material as listed above in connection with the embodiment of FIG. 1. A combination of different materials are also contemplated, such as within different layers of the encapsulating structures 608. Walls of the encapsulating structures 608 readily allow the passage of lithium ions to afford rapid ionic transport, while possessing high mechanical strength to suppress and sustain the pressure induced by any lithium dendrite formation, such as having a Young's modulus in the ranges listed above in connection with the embodiment of FIG. 1. In addition, the walls of the encapsulating structures 608 are electronically conductive to allow the flow of an electric current between an encapsulated lithium metal and the current collector 602. Although two stacked layers of the encapsulating structures 608 are shown in the array of FIG. 6, a single layer of the encapsulating structures 608 or three or more layers of the encapsulating structures 608 are also contemplated.

As shown in FIG. 6, seeds 612 are disposed within the spaces defined by the encapsulating structures 608, and the seeds 612 promote lithium metal deposition through, for example, a nucleation or an alloying mechanism. The seeds 612 can be formed of similar materials as listed above in connection with the embodiment of FIG. 3. In some implementations, the interfacial layer 604 can be affixed to the current collector 602, with the spaces defined by the encapsulating structures 608 being sufficient to accommodate lithium deposition during cycling. Outer surfaces of the encapsulating structures 608 are relatively static and allow the formation of a stable, conformal SEI, while lithium metal deposition takes place within the encapsulating structures 608. Also, high flexibility of the walls of the encapsulating structures 608 allow the interfacial layer 604 to accommodate the volumetric expansion of lithium metal deposition with little or no mechanical damage. The interfacial layer 604 of some implementations can be deformed or subjected to a bending radius similar to those listed for the embodiment of FIG. 1, and the material or materials forming the interfacial layer 604 can be chemically stable or inert with respect to lithium metal and components of an electrolyte, with the chemical stability manifested similarly as explained for the embodiment of FIG. 1.

In general, the interfacial layer 604 can have a thickness (t) of the walls and a width (w) and a height (h) of the encapsulating structures 608 in the ranges listed above in connection with the embodiment of FIG. 1. In the embodiment of the FIG. 6, the encapsulating structures 608 can have an aspect ratio that is about 3 or less, such as about 2.5 or less, about 2 or less, about 1.5 or less, or about 1 or less, although higher aspect ratios, such as greater than about 3, are also contemplated.

Figure 7:
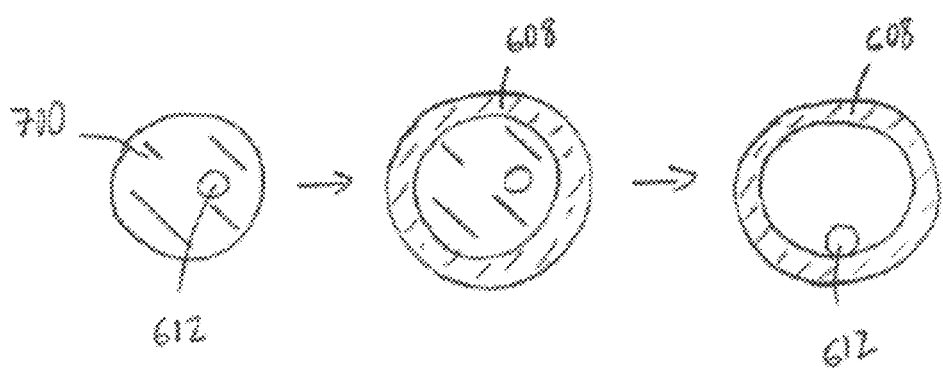
FIG. 7: Schematic of a sequence of operations of another template synthesis method of forming a lithium metal-based anode.

In an embodiment of FIG. 7, the anode 600 can be formed by a template synthesis method, involving particles 700 of a sacrificial material, such as polymeric nanoparticles, in which the seeds 612 are dispersed. A material or a combination of different materials can be deposited or coated over the particles 700, thereby forming the encapsulating structures 608. The particles 700, either before or after the coating operation, can be deposited over the current collector 602, and the coated particles 700 on the current collector 602 can be subjected to heating, dissolution, or other removal technique for the sacrificial material, thereby forming the hollow, encapsulating structures 608 on the current collector 602 as shown in FIG. 6. It is also contemplated that the encapsulating structures 608 can be initially formed on a temporary substrate, and can be subsequently transferred to the current collector 602. The resulting anode 600 with the interfacial layer 604 on the current collector 602 can be combined with a cathode with preloaded lithium ions, which are then deposited within the encapsulating structures 608 as an anode material.

Electrochemical Energy Storage Devices Including Lithium Metal-Based Anodes

Figure 8:
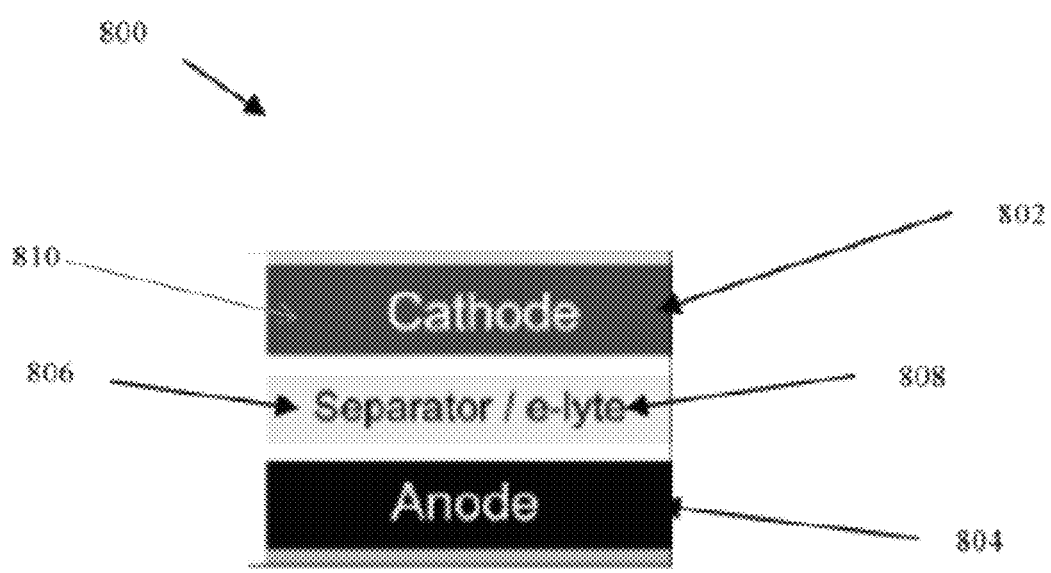
FIG. 8. Schematic of a battery including a lithium metal-based anode.

The electrodes described herein can be used for a variety of batteries and other electrochemical energy storage devices. For example, the electrodes can be used as anodes for lithium metal anode batteries, such as lithium-sulfur batteries and lithium-air batteries, among others. As shown in an embodiment of FIG. 8, a resulting battery 800 can include a cathode 802, an anode 804, and a separator 806 that is disposed between the cathode 802 and the anode 804. The battery 800 also can include an electrolyte 808, which is disposed between the cathode 802 and the anode 804. The anode 804 can be a lithium metal-based anode as described herein.

Resulting batteries, such as the battery 800, can exhibit a high Coulombic efficiency (e.g., an initial or a maximum Coulombic efficiency or one that is averaged over a certain number of cycles, such as 50, 100, 150, 200, 300, 400, 500, 1,000, or 5,000 cycles) at a current density of about 1 mA/cm$^2$ (or at about 0.25 mA/cm$^2$, about 0.5 mA/cm$^2$, about 2 mA/cm$^2$, about 5 mA/cm$^2$, about 10 mA/cm$^2$, or another higher or lower current density), such as one that is at least about 75%, at least about 80%, at least about 85%, at least about 90%, at least about 95%, or at least about 98%, and up to about 99% or more, up to about 99.5% or more, or up to about 99.9% or more.

Resulting batteries, such as the battery 800, also can exhibit excellent retention of Coulombic efficiency over several cycles, such that, after a certain number of cycles, such as 50, 100, 150, 200, 300, 400, 500, 1,000, or 5,000 cycles, at a current density of about 1 mA/cm$^2$ (or at about 0.25 mA/cm$^2$, about 0.5 mA/cm$^2$, about 2 mA/cm$^2$, about 5 mA/cm$^2$, about 10 mA/cm$^2$, or another higher or lower current density), the Coulombic efficiency can be retained to be at least about 75%, at least about 80%, at least about 85%, at least about 90%, at least about 95%, or at least about 98%, and up to about 99% or more, or up to about 99.5% or more.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Interconnected Hollow Carbon Nanospheres for Stable Lithium Metal Anodes

Overview:

This example demonstrates that coating a Li metal anode with a monolayer of interconnected, hollow amorphous carbon nanospheres isolates Li metal deposition and facilitates the formation of a stable solid electrolyte interphase. This example demonstrates that Li dendrites are not observed to form up to a practical current density of about 1 mA cm$^{-2}$. The Coulombic efficiency improves to about 99% for more than 150 cycles. This result is significantly better than the bare unmodified samples, which usually show rapid Coulombic efficiency decay in fewer than 100 cycles. The results indicate that nanoscale interfacial engineering is a promising strategy to tackle the intrinsic problems of Li metal anodes.

Introduction:

Viable Li metal anodes involve solving two fundamental challenges: 1) Accommodating the large change of electrode volume during cycling (unlike graphite and silicon anodes where lithiation produces a volume change of about 10% and about 400%, respectively, Li metal is "hostless" and its relative volumetric change is virtually infinite); and 2) Controlling the reactivity towards an electrolyte (lithium is one of the most electropositive elements). Despite efforts, there is still very little control over the thickness, grain size, chemical composition, and spatial distribution of a solid electrolyte interphase (SEI), which makes a battery inefficient. One problem is that the SEI layer typically cannot withstand mechanical deformation and continuously breaks and repairs during cycling. As a result, Li metal batteries have low Coulombic efficiency (about 80%-90% for carbonate solvents and about 90%-95% for ether solvents) and low cycle life due to the rapid loss of Li and electrolyte in the continuous formation/dissolution of the SEI. A second problem is that Li deposition is typically not uniform across an electrode surface and can form large dendrites that cause short circuit of the battery. Thirdly, the reactions between lithium metal and electrolytes are exothermic, and large surface areas can pose risks of overheating (thermal runaway).

Considerable efforts have been put into addressing these problems using both solid and liquid electrolytes. In the case of solid electrolytes, polymers and ceramics have been developed for their perceived ability to mitigate dendrite nucleation and blocking their growth. However, most solid electrolytes have low ionic conductivity, resulting in low power output. Moreover, Li polymer batteries typically are operated at an elevated temperature to achieve reasonable power, at the expense of mechanical stability. Ceramic solid electrolytes with framework structure such as $Li_{10}GeP_2S_{12}$ and garnet type $Li_7La_3Zr_2O_{12}$ have been investigated for their high Li ion conductivity (about $10^{-2}$ to about $10^{-4}$ S $cm^{-1}$), but, like their polymer counterparts, interfacial issues remain largely unresolved.

In the case of liquid electrolytes, considerable research has focused on using additives together with chemical passivation of the Li metal surface so as to reduce electrolyte decomposition. However, the thin films formed on Li metal using these methods are composed mainly of Li compounds that are brittle and have limited cohesion with the metal surface. As a result, upon Li deposition, the film surface usually cracks due to volumetric expansion, exposing fresh Li metal for further reactions (FIG. 9a). Subsequent Li dissolution occurs, creating pits and crevices with low impedance, and Li ions flow at the defects leading to rapid growth of metal filaments and dendrites. Therefore, stabilizing the interface between the Li metal and the electrolyte is desirable for improving the cycling performance of Li metal batteries.

Figure 13:
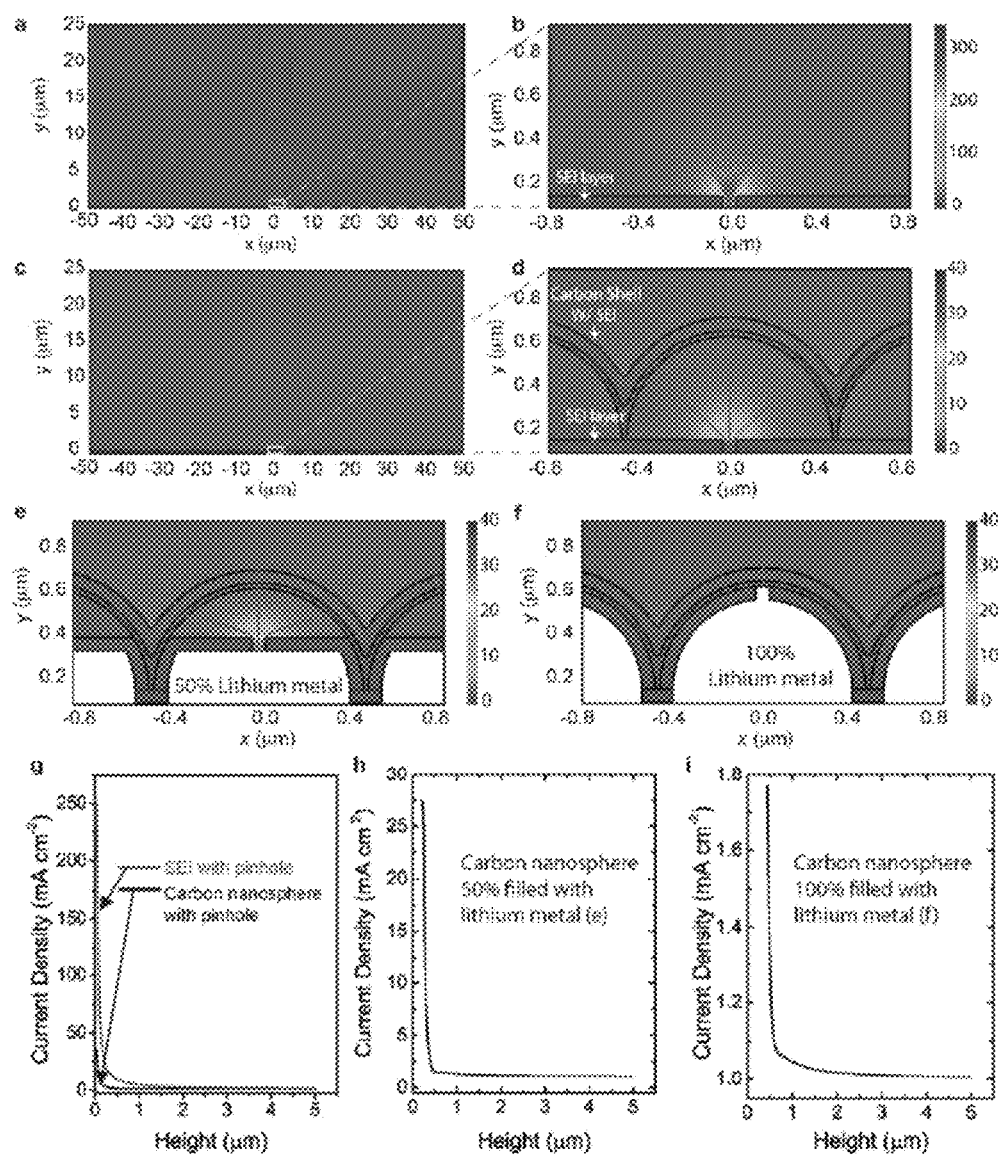
FIG. 13: Modeling of current densities in different electrode systems. a, Numerical analysis of lithium ion flux density on a flat substrate during the lithium deposition process. Contrast map represents the flux density (mA $cm^{-2}$), and solid lines represent lithium ion flow. An about 50 nm pinhole of SEI in the model is specified to simulate SEI breakdown. Concentration of lithium ion flux results in drastic increase in local current density from about 1 mA $cm^{-2}$ in the bulk electrolyte to about 253 mA $cm^{-2}$ at the pinhole. b, Zoom-in image of the pin-hole region in a. c, Numerical analysis of lithium ion flux density on the surface of the electrode with carbon nanosphere coating. The presence of the SEI-coated carbon nanosphere significantly reduces the concentration of lithium ion flux towards the pinhole. As a result, dendrite growth is suppressed. d, Zoom-in image of the pin-hole region in c. e, The effect of the carbon nanosphere on lithium ion flux when the cavity is about 50% filled with lithium. The result shows that the current density at the pinhole is gradually reduced as the cavity is filled up with lithium. f, The effect of the carbon nanosphere on lithium ion flux when the cavity is about 100% filled with lithium. g, Comparison of current density change in different electrode structures. The x-axis represents the distance from the bottom of the electrodes in a and c (the y-axis in a and c). The current density at the pinhole is decreased by about 8 times when the lithium metal is covered with the carbon thin film. h, Current density distribution along the y-axis for the case in e, where the cavity is about 50% filled with lithium. The current density at the pinhole is about 27.5 mA $cm^{-2}$. i, Current density distribution along the y-axis for the case in f, where the cavity is about 100% filled with lithium. The current density at the pinhole is about 1.77 mA $cm^{-2}$, as compared to about 253 mA $cm^{-2}$ in the case of the control electrode in b. The bulk current density at the counter electrodes are taken to be about 1 mA $cm^{-2}$ in all cases.

A desirable interfacial layer for a Li metal anode should be chemically stable in a highly reducing environment and mechanically strong. High flexibility is desired to accommodate the volumetric expansion of Li deposition with little or no mechanical damage. In addition, the ability to control the flow of Li ions with the SEI inhomogeneities is desirable to ensure uniform Li deposition. Here, this example demonstrates a flexible interconnected hollow amorphous carbon nanosphere coating with the aim to realize such a desirable interfacial layer (FIG. 9b). The advantages of the approach are at least three-fold: amorphous carbon is chemically stable in contact with Li metal; a thin amorphous carbon layer does not measurably increase impedance to charge transfer while possessing a Young's modulus of about 200 GPa, high enough to suppress Li dendrite growth—theoretical calculations have shown that a solid film with modulus higher than about 6 GPa should be sufficient for this purpose; a hollow nanosphere layer is weakly bound to a metal current collector and can move up and down to adjust the availability of the empty space during cycling. The top surface of hollow carbon nanosphere is relatively static and allows formation of a stable, conformal SEI while Li metal deposition takes place underneath, on the metal current collector. In turn, a stable SEI on the carbon nanosphere surface helps reduce the flow of Li ions toward the regions of broken SEI on the metal current collector (FIG. 13).

Figure 14:
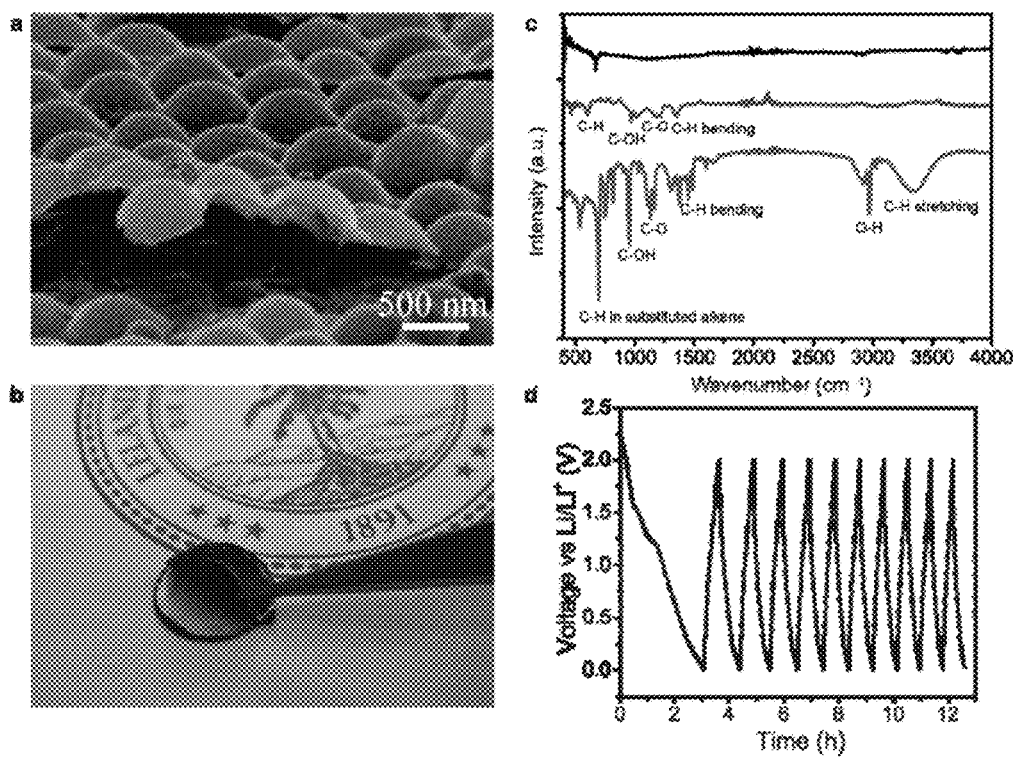
FIG. 14: Characterizations of the hollow carbon nanosphere modified electrodes. a, SEM image of the hollow carbon nanosphere thin film. b, Digital camera image showing the hollow carbon nanosphere thin film peeled off from the copper substrate. c, Fourier Transform Infrared (FTIR) Spectra of carbon spheres. The upper line is from the untreated carbon, the middle line is from the carbon after etching the copper substrate using ammonia persulfate, and the bottom line is from the plasma treated carbon. The etching solution $(NH_4)_2S_2O_8$ for the copper substrate has some oxidative effect on the carbon nanospheres, as indicated by the small peaks attributed to C—OH, C—O and C—H bending. Plasma treatment on the other hand results in stronger signals that indicate oxidized carbon surface. The C—OH and C—O groups on the carbon surface would facilitate the formation of a stable SEI layer. d, Voltage profiles for the SEI formation process during the first ten cycles of charge/discharge.

Fabrication of Hollow Carbon Nanosphere Modified Electrode:

A template synthesis method is developed for fabricating the hollow carbon nanopheres, using vertical deposition of polystyrene nanoparticles (FIG. 10a). A colloidal multi-layered opal structure was formed on copper foil by slowly evaporating about 4% aqueous solution of carboxylated polystyrene nanoparticles. The highly monodisperse polystyrene nanoparticles formed a closed-packed thin film with long-range order (FIG. 10b). The polystyrene nanoparticles were coated with a thin film of amorphous carbon using flash evaporation of carbon fibers (FIG. 10c). The slight morphology change of the carbon nanospheres to hexagonal shape could be due to the elevated temperature during the carbon coating process. The samples were then heated in a tube furnace to about 400° C. under inert atmosphere, forming hollow carbon nanopheres on the copper substrate (FIG. 10e). Transmission electron microscope (TEM) characterization shows that the carbon wall has a thickness of about 20 nm (FIG. 10f). The hemispherical carbon nanospheres are interconnected to form a thin film (FIG. 14a), which can be readily peeled off from the copper surface (FIG. 14b). Loose attachment of the carbon film to the copper current collector is desirable in allowing the protective film to be lifted up in creating space for Li deposition. Mechanical flexibility is also desirable in accommodating the volumetric change of Li deposition and dissipating the stress exerted on the Li protection layer during cycling. Digital camera image (FIG. 10d) and SEM image (FIG. 10g) show that the carbon nanosphere thin film can achieve a bending radius of about 20 µm.

Figure 15:
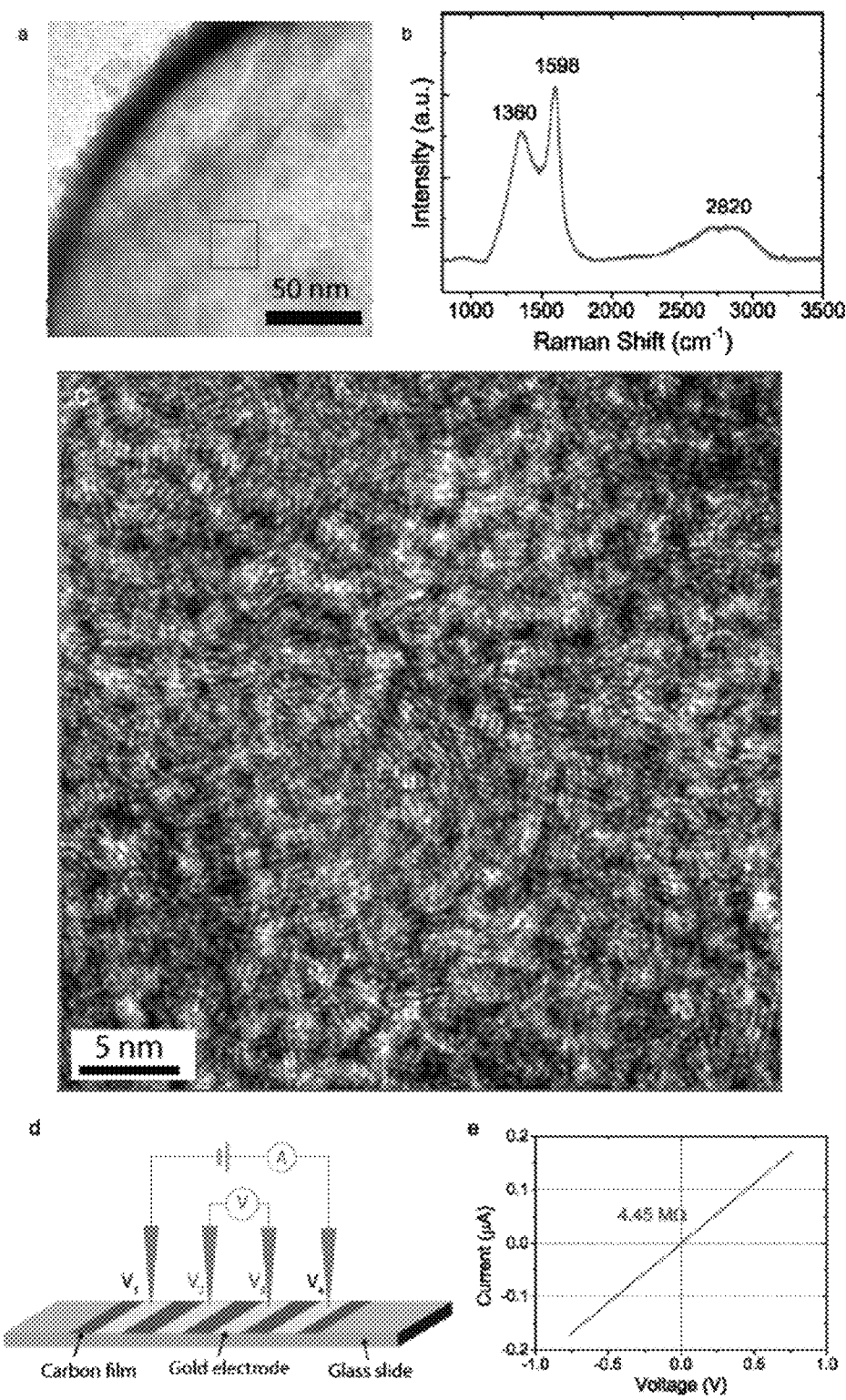
FIG. 15: Characterizations of the carbon structure. a, c, TEM images of the carbon nanosphere at low magnification (a) and high magnification (c). The high resolution TEM image shows that the amorphous carbon film does not have large pores for electrolyte penetration. There is also a smaller amount of graphitic regions, which could be intercalated during the initial cycling. b, Raman spectrum of the carbon thin film. The G band at about 1598 $cm^{-1}$ is assigned to bond stretching of $sp^2$ atoms in both the rings and chain configurations while the D band at about 1360 $cm^{-1}$ is due to the breathing mode of the ring configuration. A broad band at about 2825 $cm^{-1}$ ($sp^3$ C—H stretching mode) is also observed, indicating the presence of significant amount of hydrogen contents as C—H bonds. The peak dispersion of the D and G peaks is characteristic of highly disordered carbon structure, due to the presence of a wide range of configuration with different local phonon modes. Shown is a schematic diagram of the four-point-probe conductivity measurement. Current is supplied via the two outer force electrodes $V_1$ and $V_4$ and the voltage at the two inner sensing electrodes $V_2$ and $V_3$ is measured. e, Current-voltage curve for conductivity measurement of the carbon thin film. The current is plotted versus the potential drop between $V_2$ and $V_3$, and the sheet resistance can be calculated from the gradient of the curve.
Figure 18:
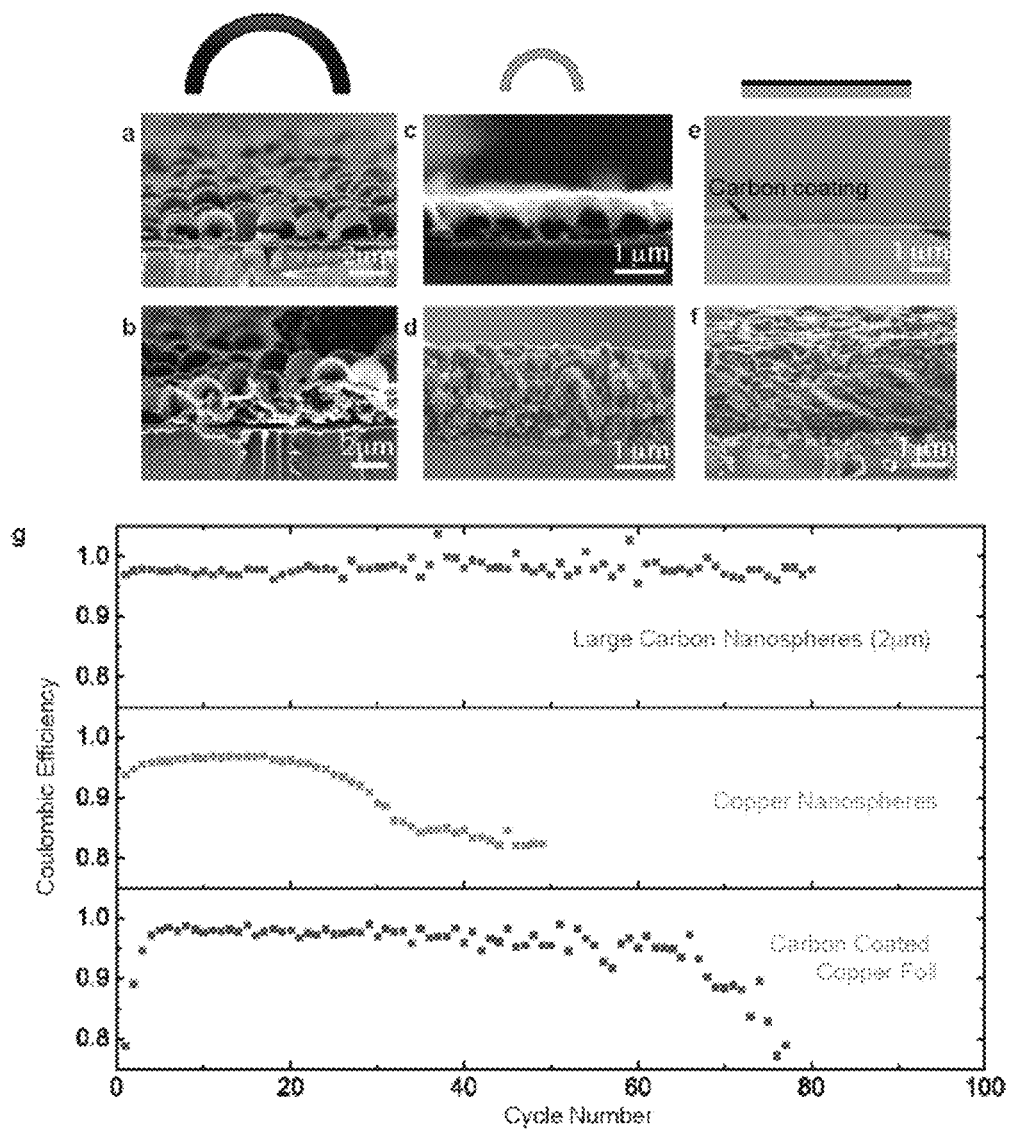
FIG. 18: Other structures tested as protective film to modify the anode interface. SEM images of an electrode structure before and after lithium deposition are shown in a-f: a and b, Large carbon nanospheres with about 2 μm diameter; c and d, Copper Nanospheres; e and f, Carbon coated copper foil. The cycling Coulombic efficiency of the corresponding structures is shown in g. Overall, the hollow carbon nanosphere structure is desirable in stabilizing lithium metal cycling. Changing the coating material to copper aggravates the dendrite formation problem, as the electrode surface is roughened by the copper nanospheres. Copper electrodes coated with carbon thin film do not show significant improvement in cycling performance, as the film is cracked during the cycling process.
Figure 19:
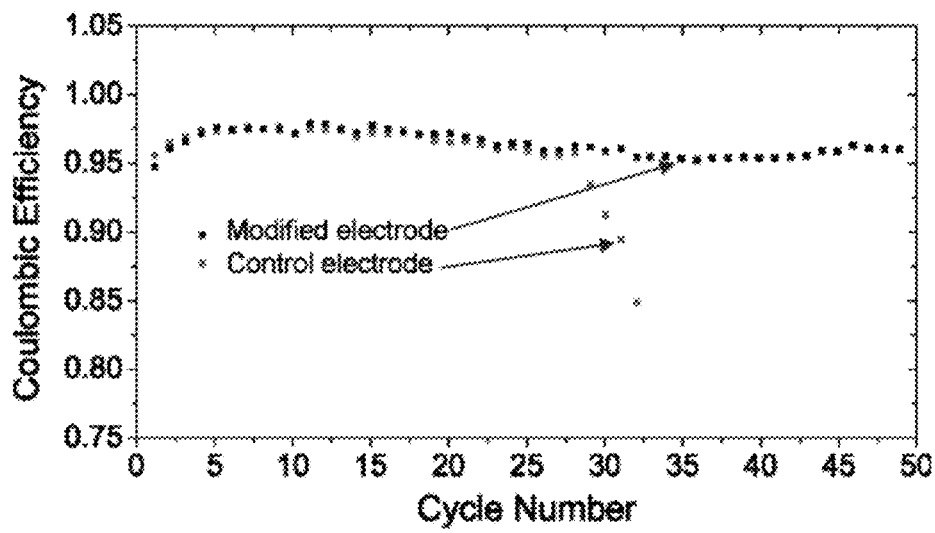
FIG. 19: High areal capacity cycling. Cycling performance of the modified and control electrode cycled at about 1 mA cm$^{-2}$ for a total of about 3 mAh cm$^{-2}$ of lithium. The Coulombic efficiency of the carbon nanosphere modified electrode is about 97.3%. The control electrode on the other hand shows rapid decrease in Coulombic efficiency below about 90% after about 30 cycles.

SEM Characterization of Lithium Deposition:

The top surface of evaporated carbon is highly insulating due to the large amount of tetrahedral bondings, while the bulk has conductivity of about 7.5 S $m^{-1}$ as calculated from four-point-probe measurement (FIG. 15). The low conductivity of evaporated carbon is due to the lack of long-range order in its structure and can reduce direct Li deposition onto the carbon. The graphitic regions would initially be lithiated and form a stable SEI on top of the carbon nanospheres to impede penetration of solvent molecules (FIG. 16a). FIG. 11a shows the top view of the hollow carbon nanospheres after SEI formation. The cross-sectional image shows that the hollow nanosphere structure is preserved after cycling (FIG. 11a inset). Electrochemical performance of the as-fabricated anode structure was tested using constant current polarization. FIG. 11b shows the hollow nanosphere modified electrode at the beginning of Li deposition. Li metal starts to nucleate within the hollow carbon nanospheres on the copper substrate. As Li continues to deposit, granular Li starts to grow and elevate the hollow carbon nanosphere film (FIG. 11c and FIG. 16e), confirming the design of depositing Li metal underneath the carbon. The deposited Li metal has a column-like morphology with a diameter of 3.0±0.3 µm and no long filaments or dendrites pointing out, which are common for lithium deposited on bare copper (FIG. 11e). The drastic change in the morphology is a good indication of the lack of SEI layer on the deposited lithium, allowing the lithium to merge together. In the control cell, the deposited lithium is almost immediately passivated by the SEI layer, which prevents the lithium metal from merging, and thus the surface area is significantly increased. As shown in FIG. 11d, the top surface of the electrode after 50 cycles of charge/discharge at about 1 mA $cm^{-2}$ is relatively uniform without overgrowth of Li dendrites. In contrast, direct deposition of Li metal onto copper electrode results in uneven growth of mossy Li with thin Li filament visible (FIG. 11f). Another control sample tested is the cycling of Li on flat carbon coated copper electrode without nanosphere morphology (FIG. 18). The rigid carbon coating tends to crack upon cycling, and the Coulombic efficiency drops rapidly after about 50 cycles. Compared to the flat carbon film, the differences on the flexibility of the hollow nanosphere interfacial layer and its weak bonding to the copper current collector are highlighted.

In-Situ TEM Observation of Lithium Deposition:

To further understand the Li deposition phenomenon within the hollow carbon nanospheres, in-situ TEM experiments are carried out using a specialized dual-probe biasing TEM holder (Nanofactory Instrument). One probe was a copper metal wire decorated with hollow carbon nanospheres, and the other probe was a tungsten wire with a small piece of Li metal attached to the tip (FIG. 11g). Since the Li metal was exposed to the air for a few seconds when transferring the holder into the TEM, a thin layer of $Li_xO$ formed on the Li metal. This thin oxide layer acts as a solid electrolyte for the nanoscale electrochemical cell. By manipulating a piezoelectric motor on the TEM holder, the hollow carbon nanospheres came into contact with the lithium oxide, and a voltage bias was applied to drive the Li ion through the oxide solid electrolyte toward the carbon nanospheres. FIG. 11h shows a series of bright field TEM images of the carbon nanospheres during the Li deposition process. The experiments showed that Li starts to deposit on the copper wire underneath the carbon nanospheres almost immediately after the voltage bias was applied. After about 25 seconds of lithium deposition, the average thickness of the Li increases by about 26%. Further deposition for another about 6 seconds increases Li thickness by another about 25%. The morphology change of the deposited Li in lifting up the carbon nanospheres is demonstrated. The data confirm visually the design of depositing Li underneath carbon while maintaining the integrity of the carbon nanospheres.

Electrochemical Testing of the Modified Electrodes:

The stable interfacial layer of hollow carbon nanopheres demonstrated above opens up the opportunity to improve the Coulombic efficiency of Li metal anode. The Coulombic efficiency is an important parameter for long cycle life and is specified as the ratio of the amount of Li that is stripped from the working electrode versus the amount that is plated during each cycle. Since the cycle life of batteries with Li metal electrodes is related to the electrolyte decomposition, a fair comparison of electrode performance is to use a controlled amount of electrolytes. In order to standardize the electrochemical performance, about 30 μl of electrolytes was used in each coin cell testing. In the half-cell configuration, Li is electrochemically deposited (at about 1 mAh $cm^{-2}$) from the Li metal counter electrode onto the hollow nanosphere modified working electrode and then stripped away. The Coulombic efficiency here reflects the loss on the working electrode since the Li metal counter electrode has excess Li. For cycle life testing, these batteries fail due to the depletion of the electrolytes from the reaction with Li metal. As a result, internal resistance increases rapidly in batteries that have severe electrolyte decomposition. The reduced electrolyte contact with active materials also results in the pronounced increase in local current density, which subsequently promotes more dendrite formation. The electrochemical performance shows that the cycling performance of the Li metal working electrodes with the carbon nanosphere coating is significantly improved. The Coulombic efficiency is maintained at about 99% for more than about 150 cycles at about 0.25 mA $cm^{-2}$ and about 98.5% at about 0.5 mA $cm^{-2}$ (FIG. 12a). In comparison, the cells without the hollow carbon nanosphere coating show gradual decrease in Coulombic efficiency, which eventually drops to less than about 50% after about 100 cycles at about 0.25 mA $cm^{-2}$ and about 0.5 mA $cm^{-2}$. In the control sample with copper foil coated with flat carbon film, the performance is also relatively poor, with the Coulombic efficiency dropping to below about 90% after about 70 cycles (FIG. 18). When tested at high current density of about 1 mA $cm^{-2}$, the Coulombic efficiency for Li metal working electrode with carbon nanosphere coating is still maintained at about 97.5% for more than about 150 cycles, while the control copper electrode showed rapid decay after about 100 cycles. Using an alternative testing method (Methods in Supplementary Information), in which about 2.5 mA $cm^{-2}$ of lithium is initially deposited followed by 10 cycles of deposition/dissolution of about 0.5 mAh $cm^{-2}$ of lithium, a Coulombic efficiency of about 99.5% was achieved at about 0.5 mA $cm^{-2}$, which is higher than the previous results. For example, Li metal cycling in ether-based electrolyte usually has a Coulombic efficiency of about 95%-98%. The Li metal batteries in the present example shows consistently stable, high Coulombic efficiency cycling, which can be attributed to the more uniform Li deposition underneath the hollow carbon nanospheres, more stable SEI formation on top of nanospheres, and reduction of electrolyte decomposition.

Figure 16:
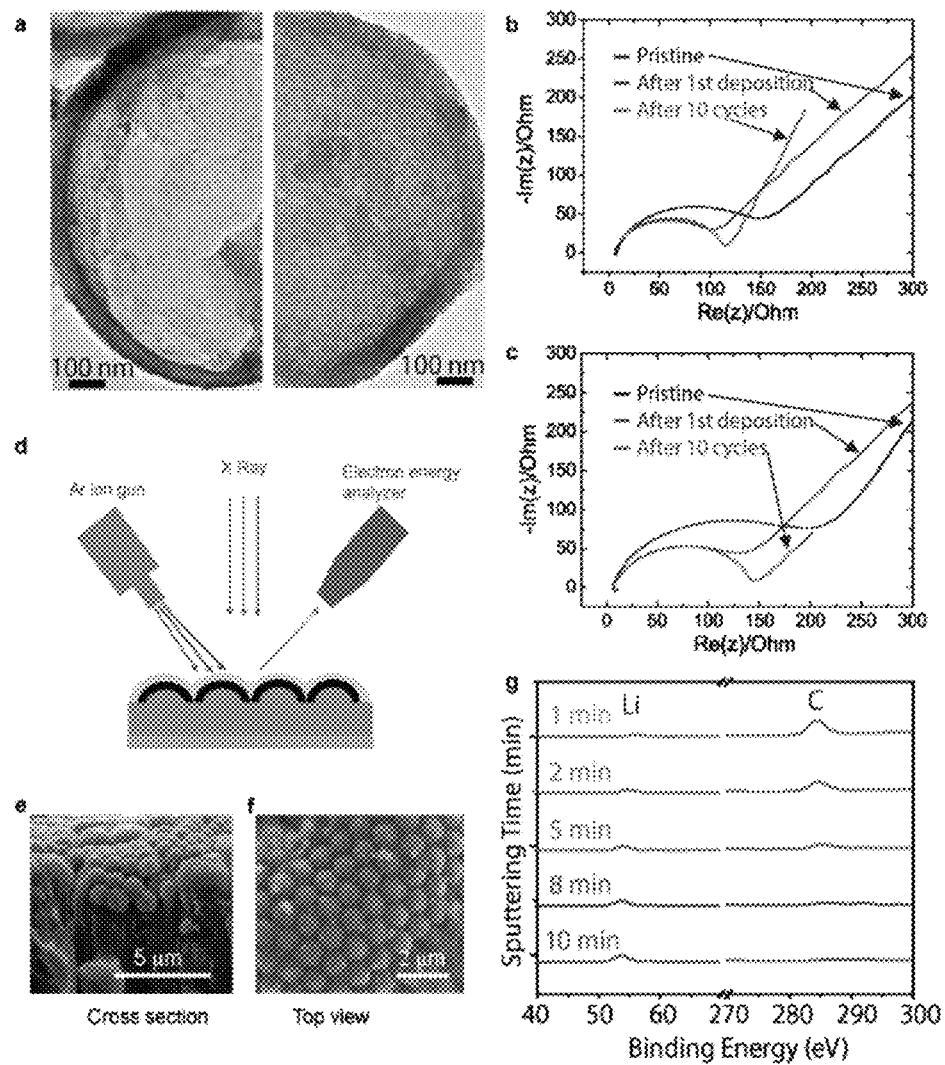
FIG. 16: Structure and properties of the hollow carbon nanospheres. a, TEM images of the hollow carbon nanosphere after initial SEI formation (left) and after 10 cycles of lithium deposition/dissolution (right). Together with the SEI layer, the carbon film allows lithium ion transport through the interface but not the solvent molecules. The stable SEI layer on the carbon nanosphere is preserved throughout cycling, and there is no significant damage to the thin film, which indicates that penetration of electrolyte molecules is significantly reduced. The overall effect is manifested in the improved cycling performance and higher Coulombic efficiency of the carbon-modified electrode. b, c, Impedance spectroscopy before and after lithium cycling for the carbon nanosphere modified electrode (b) and the control electrode (c). The charge transfer impedance through the interfacial carbon layer, as indicated by the semicircle at high frequency, stays at about 105 to 110 ohm between the first deposition and 10th cycles. On the other hand, the impedance of the control sample without the carbon nanosphere protection increases to about 150 ohm after the 10th cycle, indicating that excessive formation of SEI has resulted in poor lithium ion transport. Therefore, carbon coating has even smaller impedance to lithium ion transfer than bare electrode. d, Schematic diagram of the depth profiling X-ray photoelectron spectroscopy (XPS) characterization of the carbon nanosphere thin film. e, f, Cross section (e) and top view (f) SEM images of the carbon nanosphere covered lithium deposit. g, XPS spectra of the composition depth profile of the carbon nanospheres. The carbon nanosphere could have been lithiated as a small Li peak and a strong C peak are observed near the surface. The Li peak gradually increases as the C peak decreases after about 5 mins of sputtering, indicating the carbon nanosphere layer has been removed by sputtering, exposing the lithium metal underneath.
Figure 17:
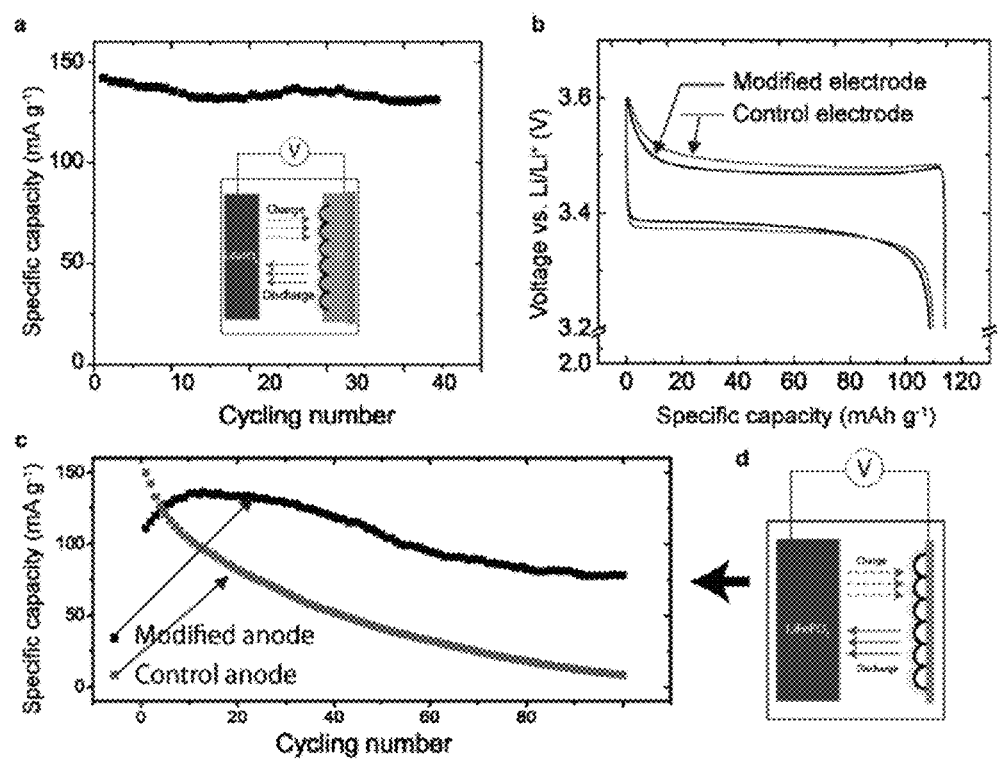
FIG. 17: Electrochemical performance of the modified lithium metal anode in full cell with $LiFePO_4$ cathode. a, Cycling performance of the hollow carbon nanosphere modified lithium metal anode pairing with $LiFePO_4$ cathode. The hollow carbon nanospheres thin film is transferred onto lithium metal by first etching away the copper substrate and then pressing the thin film onto lithium surface. The modified lithium metal anode is paired with $LiFePO_4$ and cycled at about 1 mA cm$^{-2}$. b, Voltage profiles of $LiFePO_4$ cathode and copper foil with and without hollow carbon nanosphere modification. The cell configuration is illustrated in d, where the anode has no pre-deposited lithium. One line represents a cell with the control electrode, and the other line represents a cell with hollow carbon nanosphere modified copper foil. The reduction in hysteresis is attributed to the uniform SEI film afforded by the hollow carbon nanosphere interfacial layer. c, Cycling performance of $LiFePO_4$ pairing with the modified and control electrodes. Since there is no lithium at the anode, the capacity decay can be largely attributed to the non-unity Coulombic efficiency at the anode. If the decay is taken from the highest specific capacity to the 100$^{th}$ cycle as due to the lithium consumption at the anode, the Coulombic efficiency calculated from this experiment is about 99.4%. On the other hand, the Coulombic efficiency of the control electrode is about 97%, and capacity is observed to decay rapidly over cycling. d, Schematic diagram of the full cell fabricated with $LiFePO_4$ cathode and the carbon nanosphere modified current collector.

Impedance spectroscopy reveals that the carbon nanosphere modified electrode has lower interfacial charge transfer resistance than the control electrode, due to the preservation of a stable SEI layer (FIG. 16). The effect of stable SEI formation and reduction of electrolyte decomposition can also be seen in the reduction of polarization (hysteresis) in the voltage profile during Li deposition/dissolution. The Li deposition voltage for the modified electrode is about −25 mV (vs Li/Li+) while that for the pristine copper is about 50 mV. The Li dissolution is about 25 mV and about 50 mV, respectively (FIG. 12b). For the electrode without modification, the voltage hysteresis in the Li deposition/dissolution increases gradually as the cycle number increases, with the difference in potential of about 210 mV after about 80 cycles (FIG. 12c). With the hollow carbon nanosphere modification, the hysteresis is much smaller, about 50 mV after about 50 cycles. This smaller hysteresis is attributed to the lower charge transfer and internal resistance resulting from thinner SEI layer, which are also evident in the cycling of the different anodes with $LiFePO_4$ cathodes (FIG. 17b). The hollow carbon nanosphere thin film can be transferred onto the Li metal foil to be paired with Li-containing cathode materials such as $LiFePO_4$ for high energy density batteries (FIG. 17a).

Conclusion:

In conclusion, this example has demonstrated that interfacial layer of hollow carbon nanospheres allows stable Li metal anode cycling up to a practical current density of about 1 mA $cm^{-2}$ and with an areal capacity of about 1 mAh $cm^{-2}$. The cycling Coulombic efficiency can be highly stable at about 99% for more than about 150 cycles. Future optimization of this approach can be used to develop practical batteries (Coulombic efficiency>99.9% and alternative electrolyte combinations to meet different battery chemistries). A viable route to this end could be to combine the nanoscale engineering approach described here with electrolyte additives. Anodes with interfacial layers on current collector can be combined with cathodes with preloaded Li ions such as lithium metal oxides and $Li_2S$. This example demonstrates that the interfacial nanoscale engineering approach can improve the lithium metal cycling performance. The nano-engineering concepts described here can be a viable route towards Li metal anode batteries and, more specifically, high energy density batteries, such as Li—S and Li—$O_2$.

Methods

Fabrication of Modified Electrode:

100 µl of polystyrene nanoparticles (about 0.78 µm) aqueous suspension (10 w/w %, Thermal Scientific) was drop-casted onto a copper foil disc (about 7/16"). The solvent was allowed to evaporate at room temperature for about 2 hours. The polystyrene nanoparticles self-assemble into a hexagonally close packed structure. The vertical deposition of colloidal crystal was due to the small density difference between the polystyrene nanoparticles and the solvents. As a result, the evaporation rate of the colloidal solvent exceeded the sedimentation rate of the nanoparticles, allowing the nanoparticles to accumulate at the solvent-air interface. As the particle concentration increased, the lateral capillary immersion forces arrange the nanoparticles into hexagonal packing. To form carbon nanospheres, the close-packed polystyrene nanoparticles were first coated with amorphous carbon in a carbon coater (EMS150R ES). Carbon fibers were used as the evaporation target. The evaporation chamber is first pumped down to $5 \times 10^{-2}$ mbar before an outgassing current of about 30 A is passed through the carbon fibers. After outgas recovery, a pulse current is passed through the fiber to allow flash-evaporation of carbon. The pulse current is set to about 60 A for about 20 seconds with about 10 second interval in between the pulses. To remove the polystyrene templates, the sample was put in a tube furnace and heated under argon at about 500° C. for about 1.5 hour (ramping rate of about 5° C./min). The hollow carbon nanospheres were then plasma treated to facilitate the formation of stable SEI (FIG. 14c). The electrode was then coated by polyvinylidene fluoride (PVDF) by spin-coating about 100 µl of about 5% PVDF solution in N-methyl pyrrolidone (NMP) onto the sample (about 1000 rpm for about 1 min). The NMP solvent was removed by placing the samples in a vacuum oven for about 3 hours at about 50° C. To transfer the hollow carbon nanosphere thin film onto the lithium metal anode, the copper substrate used in the fabrication process is etched away in $(NH_4)_2S_2O_8$ solution, and the thin film is dried in vacuum oven before being pressed onto the lithium metal anode.

Fabrication of the Control Electrode:

The control electrode is fabricated by first spin coating a thin layer of PVDF onto the copper current collector. After drying, the electrode is assembled in a coin cell with lithium metal as both the reference and counter electrode. Pretreatment of the control electrode was carried out as in the modified electrode by cycling the battery between about 0 to about 2 V for about 10 cycles. The electrode was then tested by depositing and dissolving a controlled amount of lithium at different current densities.

Electrochemical Testing:

Galvanostatic experiments were done using a 96-channel battery tester (Arbin Instrument). The working electrodes were assembled in 2032-type coin cells (MTI Corporation) with lithium metal (Alfa Aesar) as reference electrode and counter electrode. The electrolyte is 1 M lithium bis(trifluoromethanesulfonyl)Imide (LiTFSI) in 1,3-dioxolane and 1,2-dimethoxyethane (volume ratio of about 1:1) with about 1% lithium nitrate and about 100 mM $Li_2S_8$ additives. The presence of lithium nitrate and $Li_2S_8$ aids in the formation of a stable SEI on the lithium metal electrode. For the Coloumbic efficiency test, lithium metal is used as both the working and reference electrode. The lithium metal reference electrode is soaked in a 2% lithium nitrate solution in DOL/DME overnight before assembling the coin cells. To standardize the testing, about 30 µl of electrolytes was used in each coin cell testing. The batteries are first cycled between about 0 V to about 2 V to form a stable SEI on the hollow carbon spheres (FIG. 14d). Cycling tests were carried out by first depositing about 1 mAh of lithium onto the copper electrode, followed by lithium stripping up to about 2 V. For testing of the modified anode in a full cell, lithium iron phosphate (LiFePO$_4$, MTI Corp) at about 1 mAh cm$^{-2}$ is used as the cathode materials. AC impedance was carried out using a Bio-Logic VMP3 tester with a frequency range between about 0.1 Hz to about 1 MHz.

Supplementary Information

Numerical Simulation:

'Comsol multiphysics' is used for the numerical analysis of current distribution in the different electrode structures. The 'Conductive DC media' module is used to solve the governing equation below:

$$\nabla \cdot d(\sigma \nabla V) = 0$$

where, σ is ion conductivity, V is voltage, and d is the thickness in the z direction (a two dimensional structure is specified on the x-y plane). Total width of the calculated structure is about 50.4 µm and its height is about 25 µm (FIG. 13). The diameter and thickness of carbon nanospheres are about 800 nm and about 20 nm, respectively. The bottom boundary of the whole structure is filled with carbon nanosphere array on which about 50 nm thick SEI layer is covered. The width of the SEI pinhole is taken to be about 50 nm. The ionic conductivity of the electrolyte is taken as about $1 \times 10^{-2}$ S cm$^{-1}$, while that of the SEI is taken as about $1 \times 10^{-5}$ S cm$^{-1}$. The top boundary of the structure is specified as the lithium source, and a current density of about 1 mA cm$^{-2}$ is applied across the electrodes. The contrast map represents current density with their shading ranges adjusted for each case. The solid line represents current flow for clear visualization of current concentration. For a fair comparison of the current distribution, the starting points of the streamlines (solid) are defined on identical location on the top boundary for all specified structures as shown in FIG. 13.

Four-Point-Probe Measurement:

The four-point-probe method allows for minimizing the contact resistance between the electrode and the carbon substrate. The results provide accurate estimation of the sheet resistance and conductivity of the carbon thin film. To perform the measurement, carbon thin film is coated onto a glass slide using flash evaporation of carbon cord. Four parallel gold electrodes are deposited onto the carbon thin film using e-beam evaporation with a mask. Current is supplied via the two outer electrodes $V_1$ and $V_4$, and the voltages at the two inner electrodes $V_2$ and $V_3$ are measured. The current is then plotted versus the potential drop between $V_2$ and $V_3$ (FIG. 15d). The sheet resistance can be calculated from the gradient of the Current-Voltage curve. Noting that the thickness of the carbon thin film is about 30 nm, the following equation can be used to calculate the resistivity of the carbon thin film to be about 0.13 Ω·m:

$$R = \frac{\rho}{t} \frac{L}{W} = R_s \frac{L}{W}$$

where R is the resistance measured; L, W, and t are the length, width and the thickness of the carbon thin film; ρ is the resistivity and $R_s$ is the sheet resistance.

Alternative Coulombic Efficiency Measurement:

For alternative Coulombic efficiency testing, about 2.5 mAh cm$^{-2}$ of lithium is first deposited onto the electrodes, followed by stripping and depositing about 0.5 mAh cm$^{-2}$ at a current rate of about 0.5 mA cm$^{-2}$. After about 10 cycles of lithium deposition/dissolution, substantially all the residual lithium is removed by charging to about 1 V. The cycling Coulombic efficiency is calculated using the following equation:

$$X = \frac{(N \times q_c + q_r)}{(N \times q_c + q_1)}$$

where X is the Coulombic efficiency; N is the number of cycles; $q_c$ is the amount of lithium involved in each cycle; $q_r$ is the amount of residual lithium removed at the end of cycling; and $q_1$ is the initial amount of lithium deposited. From the experiment, the Coloumbic efficiency is calculated to be about 99.5%, which is a significant improvement over previous results.

Example 2

Ultrathin Two Dimensional Atomic Crystals as Stable Interfacial Layer for Improvement of Lithium Metal Anode Overview:

Stable cycling of lithium metal anode is challenging due to the dendritic lithium formation and high chemical reactivity of lithium with an electrolyte and other materials. This example demonstrates an improved electrode design by growing two-dimensional (2D) atomic crystal layers, including hexagonal boron nitride (h-BN) and graphene, directly on copper (Cu) metal current collectors. Lithium ions were able to penetrate through defects of the 2D layers during electrochemical deposition, leading to sandwiched lithium metal between ultrathin 2D layers and Cu. The 2D layers afford an excellent interfacial protection of Li metal due to their remarkable chemical stability as well as mechanical strength and flexibility, resulting from strong intralayer bonds and ultrathin thickness. Smooth Li metal deposition without dendritic and mossy Li formation was realized. Stable cycling is demonstrated over 50 cycles with Coulombic efficiency of about 97% in organic carbonate electrolyte with a current density and areal capacity up to a practical value of about 2.0 mA/cm$^2$ and about 5.0 mAh/cm$^2$, respectively, which is a significant improvement over unprotected electrodes in the same electrolyte.

Lithium-ion batteries have been a great success as a power source for portable electronics. The emerging applications in electric vehicles have stimulated research on high-energy battery chemistry such as Si anodes, Li—S, and Li-air. Li metal anode has the highest specific capacity of about 3860 mAh/g of Li, and the lowest anode potential, and has long been considered as the "holy grail" in lithium-based batteries. However, the problems of dendritic and mossy Li formation and its highly reactive nature cause poor safety and low cycling efficiency during charge/discharge, impeding lithium metal anode from wide applications.

Figure 20:
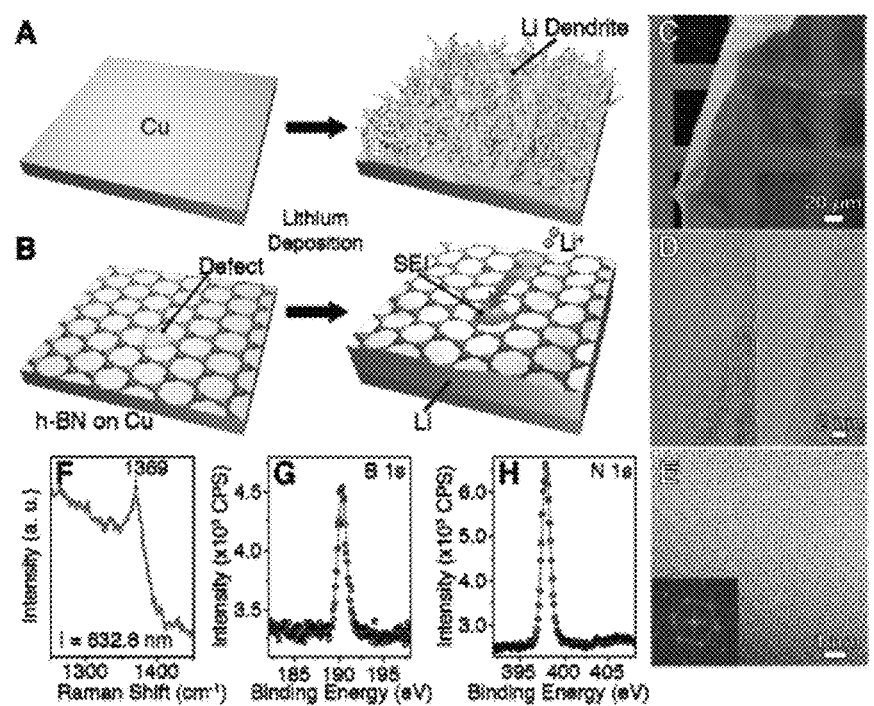
FIG. 20: Schematic diagrams of lithium deposition and characterizations of hexagonal boron nitride (h-BN) film. (A) Deposition of Li metal on bare copper substrate. A large number of Li dendrites would grow because of the lack of confinement. Spontaneously formed SEI layer with certain weak spots triggers ramified growth of lithium dendrite, resulting in significant consumption of electrolyte as well as safety issues. (B) The sub-nm defects in h-BN film grown on copper serve as channels for Li ions during lithium deposition. Lithium is deposited between h-BN and copper. The stiff B—N bond and chemical stability mitigate against dendrite formation and lithium corrosion, respectively. (C) SEM image of freestanding few-layered h-BN film. The scroll and wrinkles of the film indicates its excellent flexibility. (D) Cross section view of h-BN film with 2 (left) and 3 (right) layers captured by TEM. (E) High resolution-TEM (HR-TEM) image of monolayer h-BN film with hexagonal lattice. Triangular point defects are observed as indicated by triangles. Inset: Fast Fourier transform (FFT) of TEM image shows a single set of hexagonal spot pattern. (F) Raman spectrum of few-layered h-BN film transferred onto Si. (G) and (H) XPS spectra corresponding to core level of boron and nitrogen, respectively.

The challenges of Li metal anodes are rooted to two reasons: The first one is mechanical in nature. During battery charge and discharge, Li metal plating and striping process takes place without a host material. Different from the host nature of graphite and Si anodes in lithium-ion batteries that confine lithium ions inside a host, the spatial control of Li deposition in Li metal anodes is absent, resulting in various possible morphologies including dangerous dendrites. Compared with the finite volume expansion of graphite (about 10%) and silicon (about 400%) anode hosts, the "hostless" Li metal has virtually infinite relative volumetric change. Such a drastic volume change creates significant mechanical instability and cracks in electrodes. The second reason is chemical. Li metal reacts with chemical species in gas, liquid, and solid phases. In a liquid electrolyte, Li metal decomposes solvent and salts to form a solid electrolyte interphase (SEI). There is little control over the SEI thickness, grain size, chemical composition, or spatial distribution of the reaction products. Such a SEI layer is weak against the mechanical deformation during Li plating and striping, and it continuously breaks and repairs by reacting with more electrolyte. At the breaking point without adequate or timely repair, Li dendrite can grow out and be further amplified by strong local flux of lithium ions. These processes together cause the challenges of dendritic and mossy lithium formation, low Coulombic efficiency, and short cycle life (FIG. 20A).

To address these challenges, the hostless deposition of Li metal should be controlled with materials both chemically stable and mechanically strong. This example proposes an improved electrode structure with thin layers of such materials covering a Cu current collector such that the Li metal deposition and striping takes place in between (FIG. 20B). When searching for materials with such properties, 2D atomic crystal layered materials are identified, including graphene and h-BN. Both graphene and h-BN have the following attractive properties for the current purpose. 1) They are chemically inert and stable against most chemicals including Li metal. 2) Their single atomic layers have very strong mechanical strength, resulting from strong intralayer bonding. The in-plane elastic stiffness of a single atomic layer corresponds to a Young's modulus approaching about 1.0 TPa for both graphene and h-BN. That is more than two orders magnitude higher than that of Li metal (about 4.9 GPa) and also much higher than common inorganic components in native SEI ($Li_2CO_3$ about 68 GPa, LiF about 65 GPa, $Li_2O$ about 141 GPa). Graphene and h-BN are in principle strong enough to sustain the pressure induced by the growth of lithium metal dendrite. 3) The pore diameter within each hexagonal ring for graphene and h-BN is about 1.4 Å and about 1.2 Å, respectively. These values are smaller than the diameter of Li$^+$ ions (about 1.8 Å) and Li atoms (about 2.7 Å) and much smaller than molecules in an electrolyte. Therefore, chemical species cannot diffuse through the layers, and Li metal cannot move through the ring pore either. On the other hand, point and line defects are typically present within chemically-grown 2D layers and allow the penetration of small ions including Li$^+$ in solution, with the ionic permeability proportional to the size and density of defects. In addition, these defects surrounded by dangling bonds could be readily sealed by ionic conducting SEI, creating an ideal channel allowing the exchange of lithium ions but blocking both the penetration of lithium metal and the diffusion of electrolyte molecules. 4) Despite the large in-plane strength, 1-10 layers of graphene and h-BN are highly flexible due to their ultrathin thickness (from sub 1 nm to sub 10 nm). Their high flexibility can be important to accommodate the Li metal deposition. One difference between graphene and h-BN is that graphene is a semimetal, and h-BN is an insulator with a large bandgap of about 5.9 eV. The concept is demonstrated by first using h-BN since direct Li metal deposition on h-BN is likely to be prohibited due to its insulator nature.

A method of chemical vapor deposition (CVD) is used for synthesis of large-area h-BN. Similar with the CVD growth of graphene, copper foil was heated up to about 1000° C. in argon at low pressure followed by ammonia borane ($NH_3$—$BH_3$) vapor (See Methods for details). The partial pressure of precursor was kept at about 100 mTorr for up to about 10 min. At the initial stage of growth, discrete triangles of h-BN domains of about 2 µm in edge were formed (FIG. 24B-D). These grains gradually grow and connect with each other and coalesce into a substantially continuous film, with line defects along grain boundaries. Within about 10 min, multilayered h-BN films can form and cover the whole copper substrate. The h-BN films are flexible but mechanically strong enough to be self-supported with dimension up to millimeters, as shown in FIG. 20C. The thickness of the film was determined to vary from about 1 to about 10 atomic layers with layer distance of 0.35±0.02 nm (FIG. 20D), matching with the crystal structure of h-BN. High resolution TEM (HR-TEM) image in FIG. 20E shows atomically resolved hexagonal lattice of single layer h-BN, indicating the nature of atomic crystals. The fast Fourier transform (FFT) pattern in the inset of FIG. 20E gives a lattice distance of about 0.249 nm, corresponding well to the BN bond length. It is noticeable that vast point defects exist within the h-BN plane (shown by the circles in FIG. 20E). These point defects, together with line defects at grain boundaries, serve as active channels for lithium ions during the electrochemical cycling of lithium metal anode.

The h-BN film is further confirmed by Raman spectroscopy and X-ray photoemission spectroscopy (XPS). A prominent peak at about 1369 $cm^{-1}$ in the Raman spectrum taken on a few-layered h-BN film corresponds to the B—N vibration mode ($E_{2g}$) within a basal plane of h-BN (FIG. 20F). Two sharp peaks located at about 190.3 eV and about 397.9 eV in the XPS spectrum matches the binding energy of B 1 s and N 1 s electrons in B—N bond, respectively (FIGS. 20G and H). In addition, the ratio of B:N was found to be about 1:1.04, which is consistent with the stoichiometry of h-BN.

The as-grown samples of h-BN/Cu were directly used to build battery cells with Li metal counter electrodes. Carbonate-based electrolyte was used (1 M $LiPF_6$ in ethylene carbonate (EC): diethyl carbonate (DEC)). Under previous approaches, the performance of Li metal cycling in carbonate-based electrolyte is typically rather poor because of the high reactivity with lithium and the poor mechanical strength of a native SEI layer. It would be desirable to improve the performance for a carbonate-based electrolyte when used with Li metal anodes.

Figure 21:
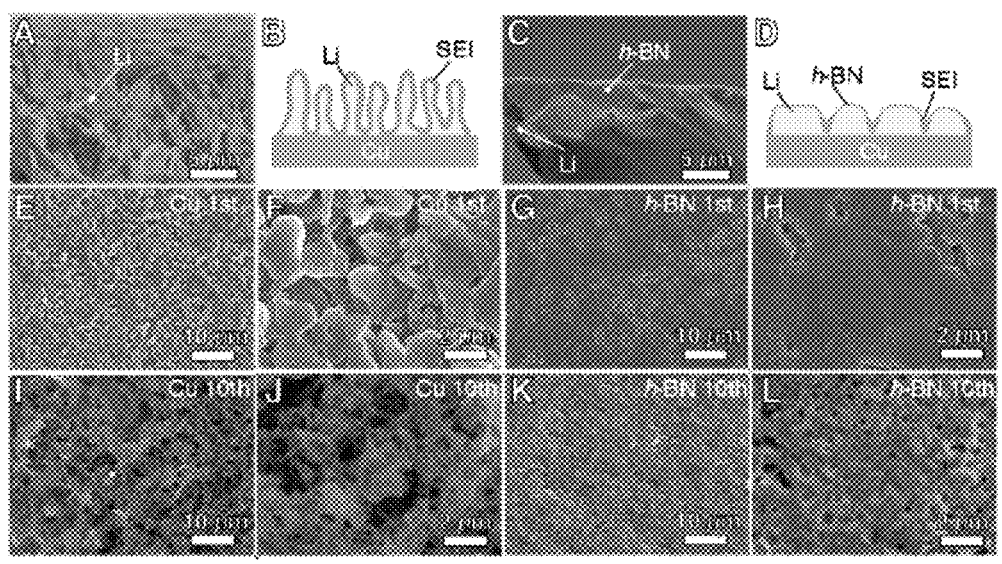
FIG. 21: Morphology studies of Li metal deposition. (A) Cross section SEM image of deposited Li metal on bare copper. (B) Schematic structure of Li metal deposited on copper. (C) Cross section SEM image of deposited Li metal protected by h-BN (D) Schematic structure of Li metal with h-BN protection. Li metal might be exposed to electrolyte between patches of h-BN film, resulting in the SEI formation. (E) and (F) Top view SEM images of the first lithium deposition on bare copper with current rate of about 0.5 mA/cm$^2$. (G) and (H) Top view SEM images of the first lithium deposition on h-BN protected anode with the same condition. (I) and (J) Top view SEM images of the 10$^{th}$ lithium deposition on bare copper with current rate of about 0.5 mA/cm$^2$. (K) and (L) Top view SEM images of the 10$^{th}$ lithium deposition with h-BN protection with the same condition.

For the bare copper anode, cross-sectional SEM images (FIG. 21A) show that wire-shaped Li dendrites and mossy Li with diameter of about 1-2 µm already form after first deposition of about 1.0 $mAh/cm^2$ lithium at a current rate of about 0.5 $mA/cm^2$. The surface area of dendritic Li is increased drastically, consuming much electrolyte to form SEI. For the h-BN/Cu electrodes, the cross-sectional SEM images (FIG. 21C) show large size pancake-like Li metal covered by h-BN film. The top surface of Li pancakes seems to be flat. The surface area is much smaller than that on the bare Cu electrode, therefore consuming much less electrolyte. More importantly, with the protection of h-BN, most of the lithium surface is isolated from direct contact with the electrolyte. Comparing top view SEM images (FIG. 21E-F for bare Cu and FIG. 21G-H for h-BN/Cu, respectively), the rough and grainy surface for the bare Cu electrodes can be observed, reflecting the top of many dendrites, in contrast to the flat and smooth top surface for the h-BN/Cu electrodes. The typical pancake size in the h-BN/Cu electrodes is about 5-10 µm. It appears that the h-BN layers are sitting on top of Li pancakes. That is, Li metal is sandwiched between h-BN and Cu, further reducing the surface area exposed to the electrolyte. There is the possibility of SEI formation at the boundaries of h-BN patches, where part of Li metal surface might be exposed to the electrolyte. However it is expected that the exposed Li surface area is reduced significantly. Based on these results, the schematic electrode structures for the bare-Cu and the h-BN/Cu electrodes are shown in FIG. 21B and FIG. 21D, respectively. The h-BN sheets serve as stable interfacial layers for Li metal deposition.

The morphology of Li after ten cycles of galvanostatic plating and stripping with current rate of about 0.5 $mA/cm^2$ was also studied. For the bare Cu, the SEI layer is broken and repaired repeatedly during the cycling, resulting in considerable non-uniformity within the layer. Consequently, dendrites with even sharper tips grew from the weak spots of the SEI layer (FIG. 21I-J). With feature size of several hundreds of nanometers, these thin dendrites contribute to an even larger surface area than the first deposition as well as a higher possibility of dead lithium upon stripping, and also potentially threatening the safety of batteries by penetrating through a separator. For the situation with h-BN protection, the surface of the anode is very smooth but may have some SEI covering h-BN (FIG. 21K-L). No Li dendrite was observed over the whole anode surface, indicating the successful suppression of Li dendrite growth by top-capping h-BN layers.

Figure 27:
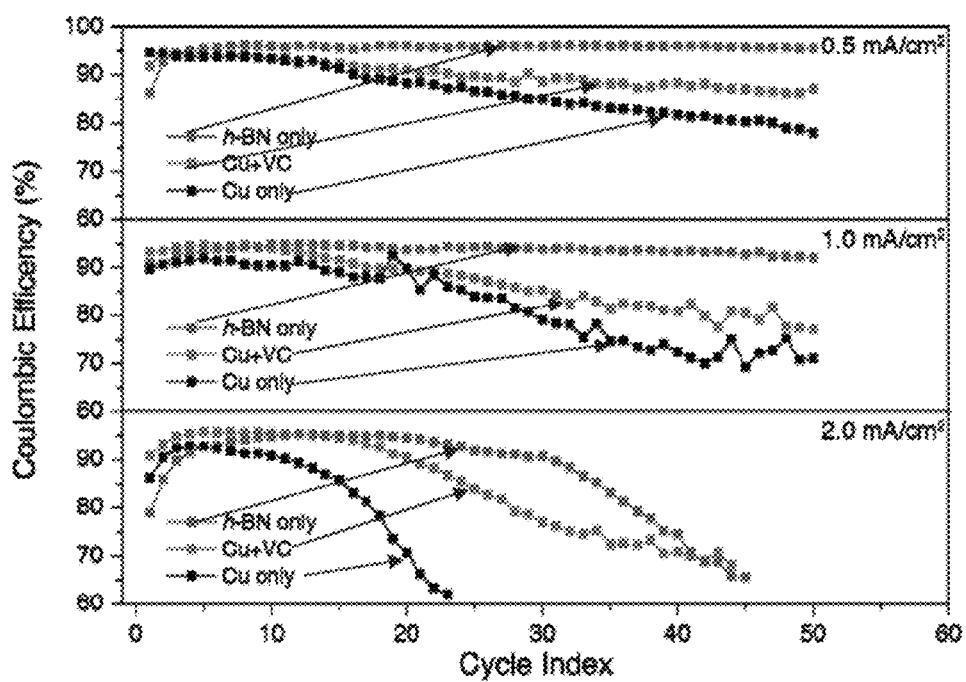
FIG. 27: Coulombic efficiency comparison of h-BN and vinyl carbonate (VC) for lithium metal anode at different current rates with the same areal capacity of about 1.0 mAh/cm². The introduction of VC increases the Coulombic efficiency of lithium metal anode at different current rates. However, decays are still evident, indicating the imperfect protection mechanism of electrolyte additives. Comparatively, the anodes protected with h-BN resulted in improved Coulombic efficiency at different current rates with reduced decay.

The cycling Coulombic efficiencies of bare copper and h-BN protected copper were further examined in organic carbonate electrolyte with Li foil as a counter electrode. The areal capacity for each lithium deposition was fixed at about 1.0 $mAh/cm^2$ followed by the extraction of Li, while the current rate varied from about 0.2 $mA/cm^2$ to about 2.0 $mA/cm^2$. The Coulombic efficiency is calculated as the ratio of the extraction versus the deposition capacity. Despite the counter Li foil with virtually infinite amount of Li, limiting the deposition capacity of Li on working electrodes allows the evaluation of the meaningful Coulombic efficiency of the working electrode. For a current density of about 0.5 $mA/cm^2$ (FIG. 22A), the Coulombic efficiency of bare copper started at about 95% and drops quickly to about 80% in less than 50 cycles. This fast decaying process on bare Cu is consistent with the increased surface area and reaction with electrolyte of lithium dendrites. Of note, the situation with h-BN is quite different. The Coulombic efficiency of lithium cycling on h-BN protected anode is about 87% for the first cycle, where there might be some trapping of lithium between h-BN layers and at the edge sites of grain boundaries. The efficiency quickly rose up to about 97% and remained stable for more than 50 cycles. This result outperformed the control battery with vinyl carbonate (VC) as an additive on bare Cu (FIG. 27). At a practically relevant current rate of about 1.0 $mA/cm^2$, the performance for bare copper became much worse. The Coulombic efficiency decayed to below about 80% in less than 30 cycles, with significant fluctuation attributed to the large surface morphology change and electrolyte consumption at high current density. In comparison, the Coulombic efficiency of the h-BN/Cu electrodes remains high and stable above about 95% for more than 50 cycles. The significant improvement in Coulombic efficiency strongly indicates the effect of h-BN film in protecting lithium metal anode from reacting with the electrolyte.

Figure 22:
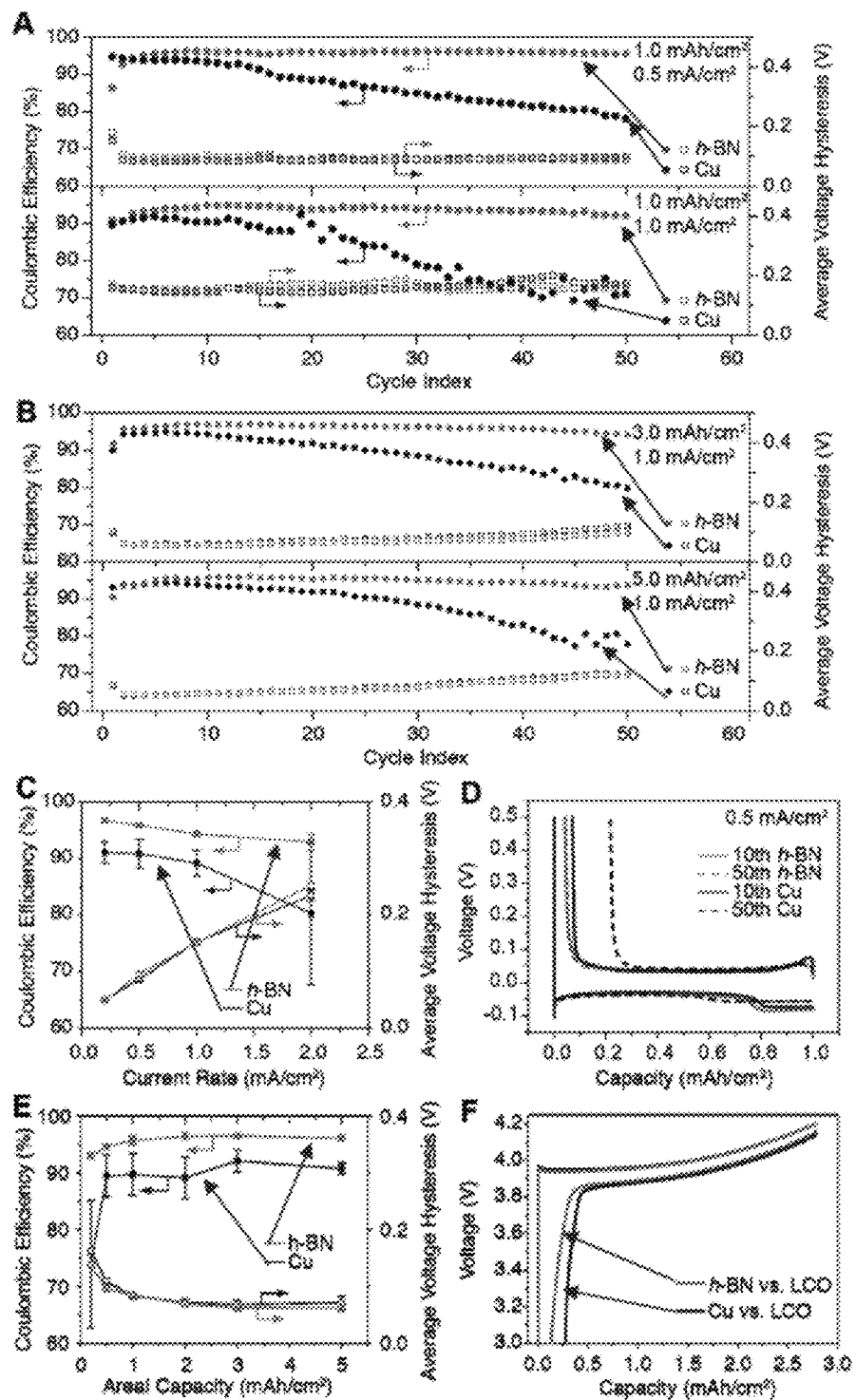
FIG. 22: Cycling performance of Li metal anode with h-BN protection at various current rates. (A) Coulombic efficiency and voltage hysteresis of Li anode with and without h-BN protection at a current rate of about 0.5 mA/cm$^2$ and about 1.0 mA/cm$^2$. (B) Coulombic efficiency and voltage hysteresis of Li anode with and without h-BN protection at different areal capacities of about 3.0 mAh/cm$^2$ and about 5.0 mAh/cm$^2$. (C) Statistics on cycling efficiency and average voltage hysteresis from 6$^{th}$ to 30$^{th}$ cycle of Li metal anode at different current rates from about 0.2 mA/cm$^2$ to about 2.0 mA/cm$^2$ with about 1.0 mAh/cm$^2$ areal capacity. (D) Voltage profile of 10$^{th}$ and 50$^{th}$ cycle with and without h-BN protection. (E) Statistics on cycling efficiency and average voltage hysteresis from 6$^{th}$ to 30$^{th}$ cycle of lithium metal anode with different areal capacity from about 0.2 mAh/cm$^2$ to about 5.0 mAh/cm$^2$ at about 0.5 mA/cm$^2$ current rate. (F) Voltage profile of full cell with lithium cobalt oxide as cathode and empty copper foil with and without h-BN protection as anode.

A possible concern with having h-BN covering the Cu surface is that the h-BN might block the $Li^+$ ion flux during plating and striping. In order to address this issue, measurements were made of the voltage profile during the cell charge/discharge with different current density. The difference (hysteresis) between charge and discharge voltages would reflect the kinetics loss due to ion flux. As shown in FIG. 22D, the voltage profiles for the cycling of lithium on the two kinds of electrodes at a current rate of about 0.5 $mA/cm^2$ coincide well at the potential of lithium plating and stripping. The voltage hystereses of the two types of electrodes over 50 cycles for two current rates (about 0.5 and about 1 $mA/cm^2$, FIG. 22A) are nearly identical. These results have two implications: First, they confirm that there is not significant reduction of $Li^+$ ion flux by covering Cu with h-BN. The ionic diffusion through atomic defects and edges of h-BN is adequate to maintain the high flux of Li+ ions. Second, they also provide evidence to exclude the possibility that deposition of lithium took place on top of h-BN, which would involve a much higher voltage for the tunneling of electrons through the h-BN film.

The Coulombic efficiency and voltage hysteresis averaged over 25 cycles at different current densities is summarized in FIG. 22C. The significant improvement in cycling efficiency by h-BN is clear over all current densities. The voltage hysteresis is nearly identical for the two types of electrodes. As expected, the voltage hysteresis increases with current density. It can be concluded that h-BN is capable of protecting Li metal anode at various current rates.

For practical batteries, areal capacities greater than about 3 $mAh/cm^2$ are desirable. The working mechanism of h-BN in principle allows for effective protection of Li film with different thickness, since the whole layer is on top of the Li layer during operation. In order to demonstrate the concept, the dependence of Coulombic efficiency as a function of areal capacity (about 0.2, about 0.5, about 1.0, about 2.0, about 3.0, and about 5.0 $mAh/cm^2$) was studied at a constant current rate of about 0.5 $mA/cm^2$. FIG. 22B shows the results on high practical areal capacities of about 3.0 and about 5.0 $mAh/cm^2$ with a current density of about 1.0 $mA/cm^2$. The Coulombic efficiency of h-BN/Cu electrodes remains high at about 95-97% even at these high areal capacities, which are much higher and more stable than the bare Cu electrodes that decays from about 92% to about 80%. FIG. 22E summarizes the averaged Coulombic efficiency versus areal capacity. The h-BN/Cu electrodes are consistently much better than the bare electrodes for all areal capacity studied. For both types of electrodes, the Coulombic efficiency shows noticeable drop for the low areal capacity (<about 0.5 $mAh/cm^2$). This may arise from a certain amount of electrolyte reaction on both types of electrodes regardless of lithium thickness. For small areal capacity, this amount can account for a larger fraction.

The capability of h-BN protection for lithium metal anode up to a practical areal capacity opens up the opportunity to construct full batteries with, for example, lithium cobalt oxide as a cathode. FIG. 22F shows the voltage versus the areal capacity of the full cell composed of two types of empty anodes (bare Cu and h-BN/Cu) at a current density of about 0.5 $mA/cm^2$, with the h-BN/Cu cells showing about 10% more discharge capacity than the bare Cu cells for the same charge capacity of about 2.8 $mAh/cm^2$. Despite the significant improvement with h-BN, the Coulombic efficiency still can be further improved for full cell cycling. Further improvement to greater than about 99.5% are contemplated with electrolyte additives and systematic tuning of h-BN layers.

Figure 23:
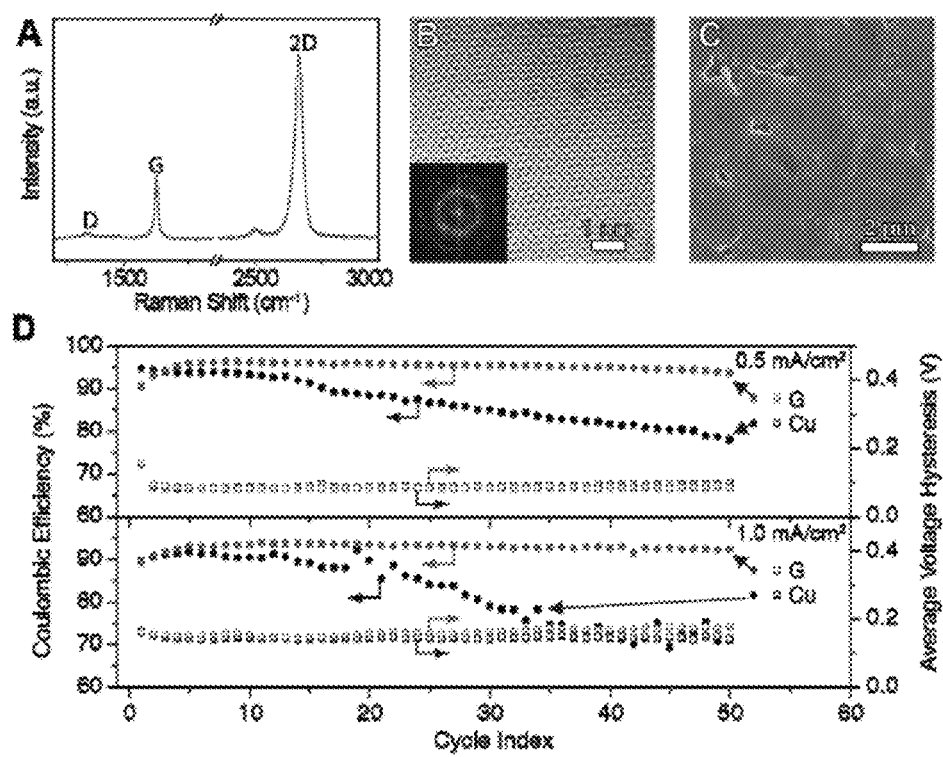
FIG. 23: Characterizations of graphene and its performance in cycling of Li metal anode. (A) Raman spectrum of graphene film. The wavelength of excitation laser is about 632.8 nm. (B) HR-TEM image of mismatched two-layer graphene. Two sets of hexagonal spot patterns were shown in the FFT image inset. (C) Top view SEM image of the first Li metal deposition on graphene protected anode at about 0.5 mA/cm². (D) Cycling performance and average voltage hysteresis of Li metal anode with and without graphene protection at different current rates.

The concept of protecting lithium with inert atomic thin layers can be extended to graphene. The CVD-grown graphene of high quality on Cu was confirmed by a weak D band and sharp G and 2D bands in Raman spectrum (FIG. 23A). The HR-TEM image of two mismatched graphene layers in FIG. 23B demonstrates the highly crystallized 2D hexagon frameworks. The length of C—C bond was calculated from the FFT pattern as about 0.141 nm, which is consistent with the reported value of graphene. Even though graphene is generally regarded as a semimetal with extraordinary carrier mobility, the interlayer conductivity may be quite limited. Also, electron transfer from the graphene basal plane to outside may be sluggish. In addition, any electron transfer can result in the formation of SEI first on the graphene basal plane above the Li metal deposition potential. It is thus reasonable to expect that, just like the h-BN/Cu electrode, Li metal deposition would take place between graphene and Cu, rather than on top of graphene. FIG. 23C shows the top surface of graphene/Cu electrodes after lithium deposition with comparable smoothness to that of h-BN, confirming similar deposition behavior. With the protection of graphene film, the cycling performance of lithium metal anode shows significant improvement over the bare Cu electrodes. The graphene/Cu anodes exhibit high Coulombic efficiency of about 95% and about 93% over 50 stable cycles at a current rate of about 0.5 $mA/cm^2$ and about 1.0 $mA/cm^2$ with areal capacity of about 1.0 $mAh/cm^2$, respectively (FIG. 23D). Compared to h-BN, the improvement of Coulombic efficiency is somewhat less, which might arise from the smaller average thickness of graphene in the CVD growth. The conductive nature of graphene may also contribute partially, considering the possible deposition at active edges.

In conclusion, this example demonstrates the introduction of 2D atomic crystal layered materials, including h-BN and graphene, as an effective protective layer to form a 2D layer-Li—Cu sandwich structure, which effectively suppresses dendrites and mossy lithium formation and improves the cycling efficiency by reducing the reaction with an electrolyte. The protective mechanism of 2D materials allows for protection of lithium with various areal capacities at different current rates. Such a protection is confirmed to still allow diffusion of Li ions.

Materials and Methods

Figure 24:
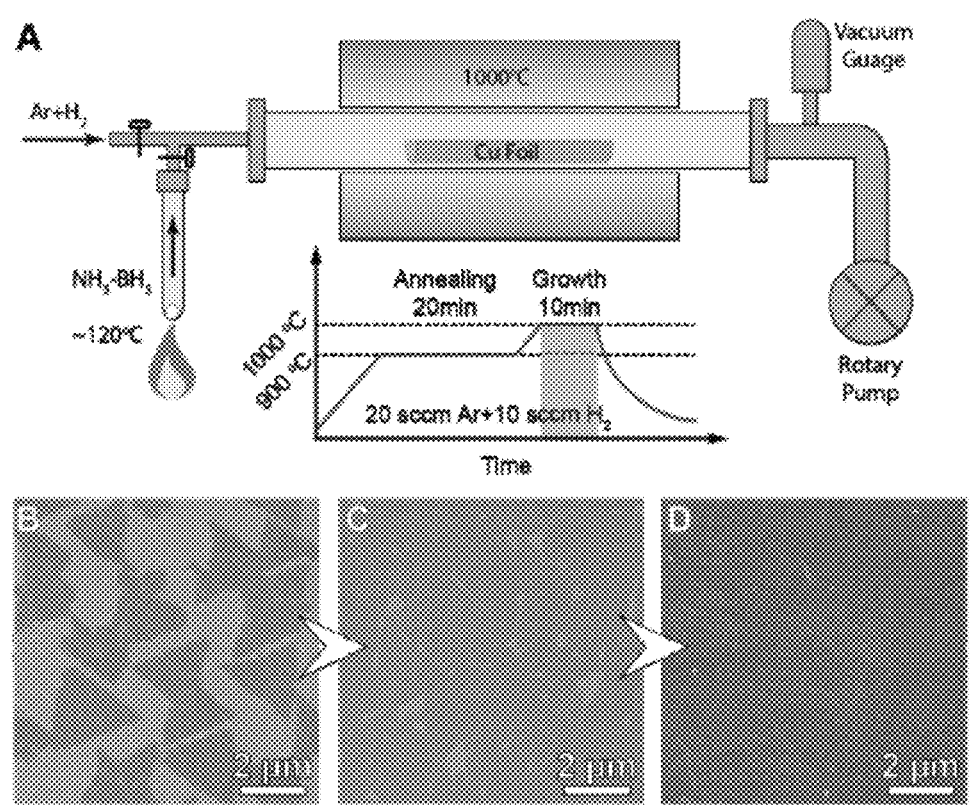
FIG. 24: Chemical vapor deposition growth of h-BN. (A) Experiment setup for h-BN growth. A piece of copper foil was loaded into 1" quartz tube of a tube furnace. A glass test tube containing ammonia borane complex was connected to the upstream of furnace via a quick connector. The system was pumped down to a base pressure below about 10 mTorr by rotary pump before mixture of about 20 sccm argon and about 10 sccm hydrogen was introduced to the furnace. After annealing the substrate at about 900° C. for about 20 min, $NH_3BH_3$ precursor was vaporized at about 120° C. by a heat gun. The partial pressure of precursor gas was maintained at about 100 mTorr by adjusting the power of heat gun. Typical growth period lasts for about 10 min, after which the furnace temperature was ramped down to about 300° C. with all inlet gas terminated. (B), (C) and (D) SEM images of as-grown h-BN sample at different stages. Discrete triangles of h-BN grains were formed at the beginning of growth (B). These grains gradually connect with each other (C) and coalesce eventually into a substantially continuous film (D). Since the growth is not self-restricted, multilayered h-BN formed throughout the film.
Figure 25:
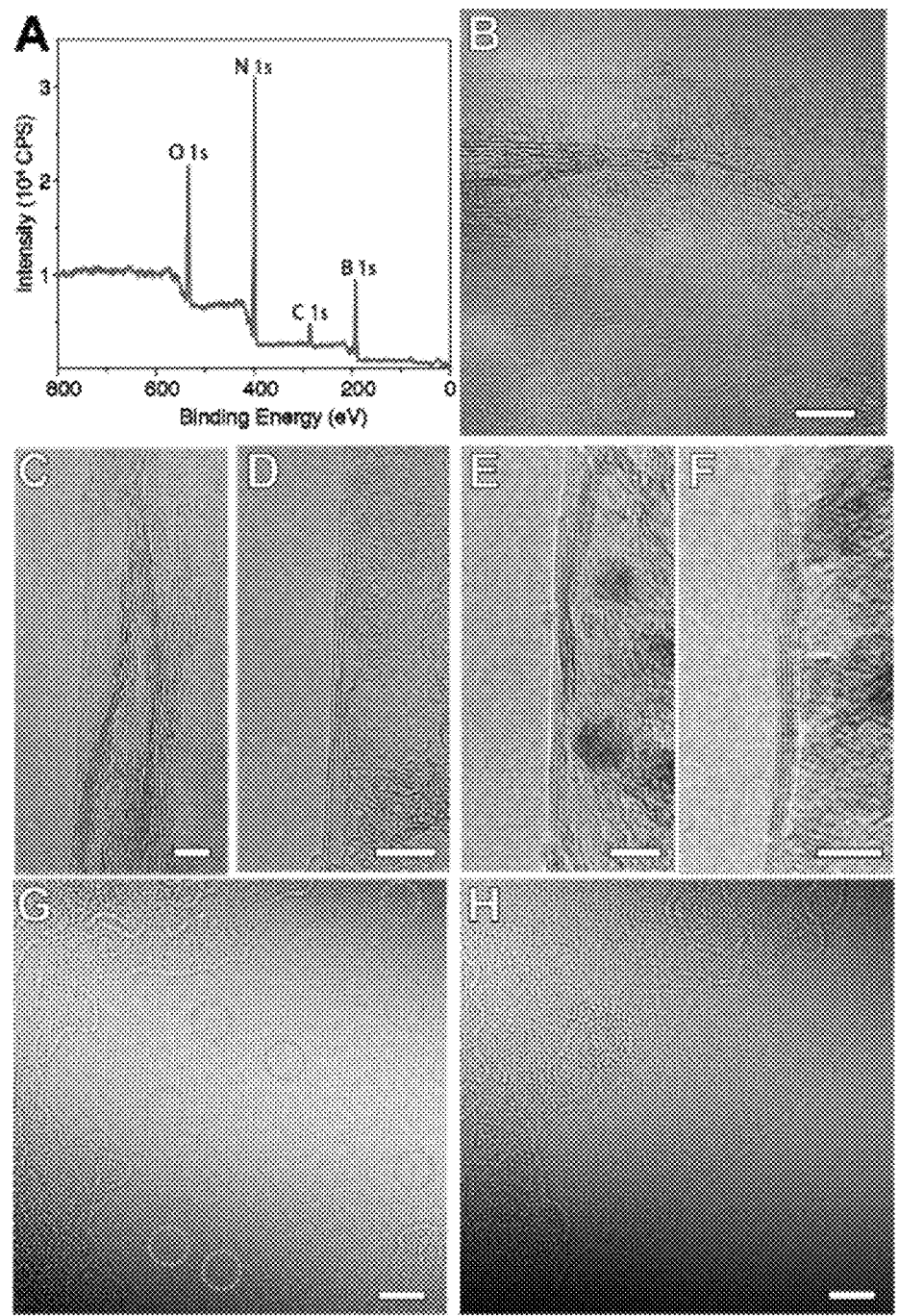
FIG. 25: Additional characterizations of h-BN. (A) Full XPS spectrum of h-BN film indicating the existence of light elements. The sharp peaks of boron and nitrogen indicated a stoichiometry ratio of about 1:1.04. Carbon and oxygen, as well as extra nitrogen, could be ascribed as environmental contaminations. (B) HR-TEM image of h-BN at relatively low magnification. Edges of h-BN with different thickness, as well as stacking of various layers, are observed. Scale bar is 5 nm. (C)-(F) HR-TEM section images of h-BN with various thickness. Scale bars are 5 nm. (G) HR-TEM image of monolayer h-BN with defect points marked by dash circles. Scale bar is 2 nm. (H) HR-TEM image of mismatched 2-layers of h-BN. Scale bar is 2 nm.
Figure 26:
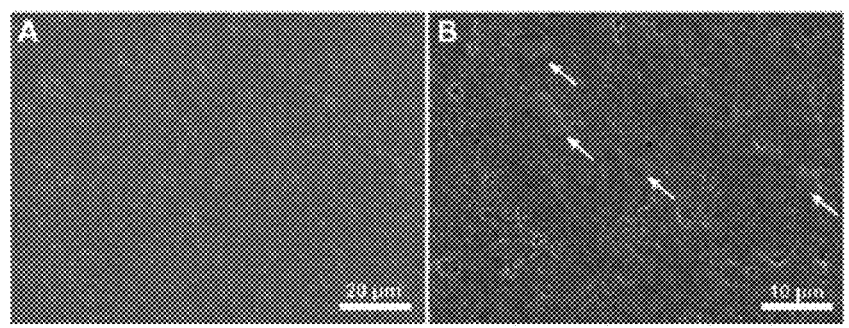
FIG. 26: Lithium deposition on h-BN protected anode at about 1.0 mA/cm². (A) SEM image of smooth anode surface deposited at elevated current rate. (B) Magnified SEM image indicating certain regions of anode surface covered by rigid h-BN films, as pointed by arrows.

Synthesis and Characterizations of h-BN and Graphene:

A low-pressure tube furnace setup is used for the growth of h-BN and graphene samples with copper foil as substrates (Alfa Aesar, 99.8%, #13382). The foil was rinsed for about 30 s in diluted nitric acid and subsequently deionized (DI) water before being loaded into the quartz tube. Before the growth, the substrate was annealed with about 20 sccm Ar and about 10 sccm $H_2$ at about 900° C. for about 20 min with pressure maintained at about 700 mTorr. For the growth of graphene, about 5 sccm $CH_4$ was introduced into the furnace for about 15 min after the temperature of furnace was increased to about 1000° C. For the growth of h-BN, about 50 mg ammonia borane precursor was loaded into the test tube (FIG. 24). Once the temperature of the furnace is stable at about 1000° C., the test tube was heated up to melt, and the precursor was decomposed by a heat gun. In order to realize uniform growth of h-BN with moderate grain size, the partial pressure was maintained at about 100 mTorr by adjusting the heat gun. The growth process usually lasts for about 10 min until full sublimation of the precursor. The furnace was allowed to ramp down to room temperature with all inlet gas stopped before the substrate was taken out.

X-ray photo spectroscopy (PHI VersaProbe Scanning XPS Microprobe) was carried out directly on as-prepared copper. Transfer of 2D films was carried out otherwise. The as-prepared 2D films on copper were transferred onto a desired substrate with Poly(methyl methacrylate) (PMMA) as supporting polymer. After etching of copper with 1 M $FeCl_3$ solution, the floating PMMA/h-BN(G) film was rinsed thoroughly by DI water. For Raman spectroscopy (Horiba JY), the polymer layer was removed by acetone after transferring the sample onto a silicon wafer. For TEM images, lacey carbon was used as supporting grid. The polymer was removed by annealing in $H_2$/Ar at about 380° C. for about 3 hours after transfer. The TEM images were captured by FEI Titan at 80 kV with spherical aberration correction.

Electrochemical Tests:

The as-grown sample was cut into about 1.0 $cm^2$ disks, followed by assembly with Cellguard separator and 0.5 $cm^2$*0.75 mm lithium foil (Alfa Aesar) disks into a 2032 coin cell. The lithium foil served as both counter electrode and reference electrode. About 20 μL solution of 1 M $LiPF_6$ in 1:1 ethylene carbonate (EC) and diethyl carbonate (DEC) (BASF Selectilyte LP40) was added as electrolyte with full wetting of both anode and cathode surfaces. No other additive was added into the electrolyte.

After loading into the battery tester (Arbin Instrument), the assembled cell was firstly galvanostatic cycled between about 0 V and about 1 V at about 50 μA for ten cycles in order to remove any surface contamination of electrodes. Later, galvanostatic lithium plating at a desired current rate and capacity was made, followed by stripping of lithium at the same current rate. The cut off voltage for stripping was set at about 0.5 V. Coulombic efficiency was calculated by the ratio of capacity between plating and stripping. By dividing total energy with total capacity for each half cycle, the average voltage hysteresis was calculated. For the high voltage cell, high capacity lithium cobalt oxide electrode was used as the cathode. The cycling electrochemical window was set as about 3.0 V to about 4.2 V.

In order to observe the surface morphology of lithium, the anode was disassembled from the coil cell, followed by gentle rinse in dimethyl carbonate (DMC). In order to carry out the cross section images, glass slides coated with about 100 nm copper were used as substrate. The slide was assembled with Celguard separator and lithium foil before packed into a pouch cell. h-BN film was transferred onto copper coated slides with removal of PMMA prior to the assembly. After deposition of lithium to desired capacity, the slide with lithium was cut apart after rinsing with DMC, exposing the cross section of deposited lithium metal.

As used herein, the singular terms "a," "an," and "the" include plural referents unless the context clearly dictates otherwise. Thus, for example, reference to an object can include multiple objects unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of 1 to 20 should be understood to include the explicitly recited limits of 1 and 20, but also to include individual values such as 2, 3, and 4, and sub-ranges such as 1 to 5, 2 to 10, 1 to 3, 2 to 3, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations is not a limitation of this disclosure.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A battery comprising:
   a) an anode;
   b) a cathode; an electrolyte disposed between the anode and the cathode, wherein the anode includes a current collector and an interfacial layer disposed over the current collector, and the interfacial layer includes an array of encapsulating structures that define interior spaces; and
   c) seeds disposed within the interior spaces, wherein the seeds are configured to promote deposition of an anode material, wherein the seed material comprises zinc.

* * * * *